(12) United States Patent
Garrettson

(10) Patent No.: US 9,324,248 B2
(45) Date of Patent: Apr. 26, 2016

(54) EXTERIOR AIRCRAFT DISPLAY SYSTEM

(71) Applicant: The Boeing Company, Chicago, IL (US)

(72) Inventor: Brook W. Garrettson, Snohomish, WA (US)

(73) Assignee: THE BOEING COMPANY, Chicago, IL (US)

(*) Notice: Subject to any disclaimer, the term of this patent is extended or adjusted under 35 U.S.C. 154(b) by 0 days.

(21) Appl. No.: 14/522,945

(22) Filed: Oct. 24, 2014

(65) Prior Publication Data

US 2015/0042494 A1 Feb. 12, 2015

Related U.S. Application Data

(63) Continuation-in-part of application No. 13/603,040, filed on Sep. 4, 2012, now Pat. No. 8,933,819.

(51) Int. Cl.
*G08B 21/00* (2006.01)
*G09F 21/08* (2006.01)
*B64D 45/00* (2006.01)

(52) U.S. Cl.
CPC ............... *G09F 21/08* (2013.01); *B64D 45/00* (2013.01)

(58) Field of Classification Search
CPC .................................. G09F 21/08; B64D 45/00
USPC .................................................. 340/945, 971
See application file for complete search history.

(56) References Cited

U.S. PATENT DOCUMENTS

| | | |
|---|---|---|
| 1,695,078 A | 12/1928 | Barker |
| 1,727,095 A | 9/1929 | Bleriot |
| 1,999,479 A | 4/1935 | Reder |
| 5,113,079 A | 5/1992 | Matulka |
| 5,570,138 A | 10/1996 | Baron |
| 5,724,161 A | 3/1998 | Smith et al. |
| 6,060,993 A * | 5/2000 | Cohen .................... B60Q 1/50 340/425.5 |
| 6,405,975 B1 | 6/2002 | Sankrithi et al. |
| 6,898,517 B1 | 5/2005 | Froebert |
| 7,136,030 B2 | 11/2006 | Steed et al. |
| 7,339,730 B2 | 3/2008 | Brodsky et al. |
| 7,545,517 B2 | 6/2009 | Rueb et al. |
| 7,646,029 B2 * | 1/2010 | Mueller .................... F21K 9/00 257/13 |
| 7,887,191 B2 | 2/2011 | Dill et al. |
| 7,922,272 B2 | 4/2011 | Baird et al. |
| 8,048,606 B2 | 11/2011 | Barr et al. |
| 8,091,822 B2 | 1/2012 | Boyce |
| 8,157,383 B2 | 4/2012 | Scanlon |
| 8,651,664 B2 * | 2/2014 | Harvey ................ G03B 21/145 244/117 R |
| 9,047,791 B2 * | 6/2015 | Cox ...................... G09F 9/3026 |
| 2002/0171927 A1 | 11/2002 | Barnes, III |
| 2003/0038928 A1 | 2/2003 | Alden |
| 2005/0116667 A1 * | 6/2005 | Mueller ................. E04F 13/08 315/312 |

(Continued)

OTHER PUBLICATIONS

"avproworldwide: projected lighting," avproworldwide, copyright 2011, 3 pages, accessed Jun. 27, 2011. http://www.avproworldwide.com/lights.html.

(Continued)

*Primary Examiner* — Eric Blount
(74) *Attorney, Agent, or Firm* — Yee & Associates, P.C.

(57) ABSTRACT

A method and apparatus for displaying information is presented. The information is sent from a number of sources to a display unit. The information is displayed through pixels located in the display unit. Heat is transferred in the display unit through a conductive path.

20 Claims, 18 Drawing Sheets

(56) References Cited

U.S. PATENT DOCUMENTS

| | | | |
|---|---|---|---|
| 2005/0209744 A1 | 9/2005 | Ihbe et al. | |
| 2005/0275626 A1* | 12/2005 | Mueller | H05B 37/029 345/156 |
| 2008/0047176 A1 | 2/2008 | Thiele et al. | |
| 2008/0211652 A1* | 9/2008 | Cope | B60K 35/00 340/461 |
| 2009/0002644 A1 | 1/2009 | Christensen et al. | |
| 2009/0195753 A1* | 8/2009 | Dill | G03B 21/00 353/28 |
| 2009/0257070 A1* | 10/2009 | Baird | B41J 3/4073 358/1.5 |
| 2010/0036717 A1 | 2/2010 | Trest | |
| 2010/0060730 A1 | 3/2010 | Poussin et al. | |
| 2010/0079729 A1 | 4/2010 | Scanlon | |
| 2011/0032484 A1 | 2/2011 | Seal | |
| 2011/0116232 A1* | 5/2011 | Brown | G09F 9/33 361/695 |
| 2011/0147528 A1 | 6/2011 | Adarve Lozano | |
| 2011/0188257 A1 | 8/2011 | Sidler | |
| 2012/0212712 A1 | 8/2012 | Scanlon | |
| 2012/0253698 A1 | 10/2012 | Cokonaj | |
| 2012/0327378 A1 | 12/2012 | Harvey et al. | |
| 2013/0238439 A1* | 9/2013 | Chatterjee | G06Q 30/02 705/14.62 |

OTHER PUBLICATIONS

"Digital Billboards," BillboardConnection, copyright 2009, 3 pages, accessed Jun. 27, 2011. http://www.billboardconnection-kendall.com/digitalbillboard.

"Light Blue Optics," Light Blue Optics, copyright 2010, 2 pages, accessed Jun. 27, 2011. http://lightblueoptics.com/.

"Types of Billboards," startupbizhub, copyright 2011, 2 pages, accessed Jun. 27, 2011. http://www.startupbizhub.com/types-of-billboards.htm.

Buckley, "Holographic Laser Projection Technology", Journal of Display Technology, Dec. 2008, pp. 22-25.

Office Action, dated May 14, 2013, regarding U.S. Appl. No. 13/169,984, 27 pages.

Notice of Allowance, dated Oct. 8, 2013, regarding U.S. Appl. No. 13/169,984, 21 pages.

Garrettson, "Exterior Aircraft Display System," U.S. Appl. No. 13/603,040, filed Sep. 4, 2012, 68 pages.

"ZoMazz: Solutions," ZoMazz, Inc., copyright 2014, 2 pages, accessed Oct. 6, 2014. http://www.zomazz.com/solutions/.

"Smart Tint: Smart Glass Effect," Smart Tint, copyright 2012, 8 pages, accessed Oct. 6, 2014. http://www.smarttint.com/.

* cited by examiner

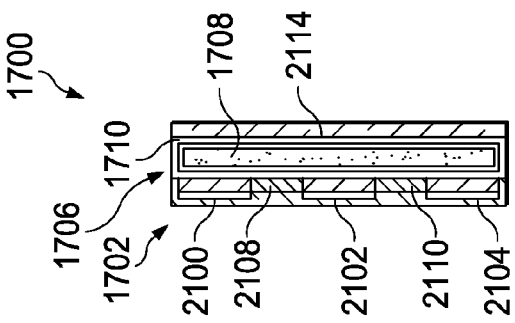
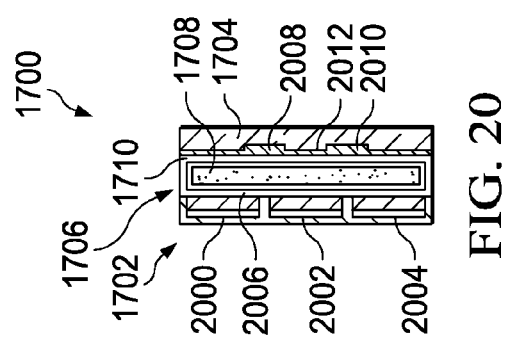
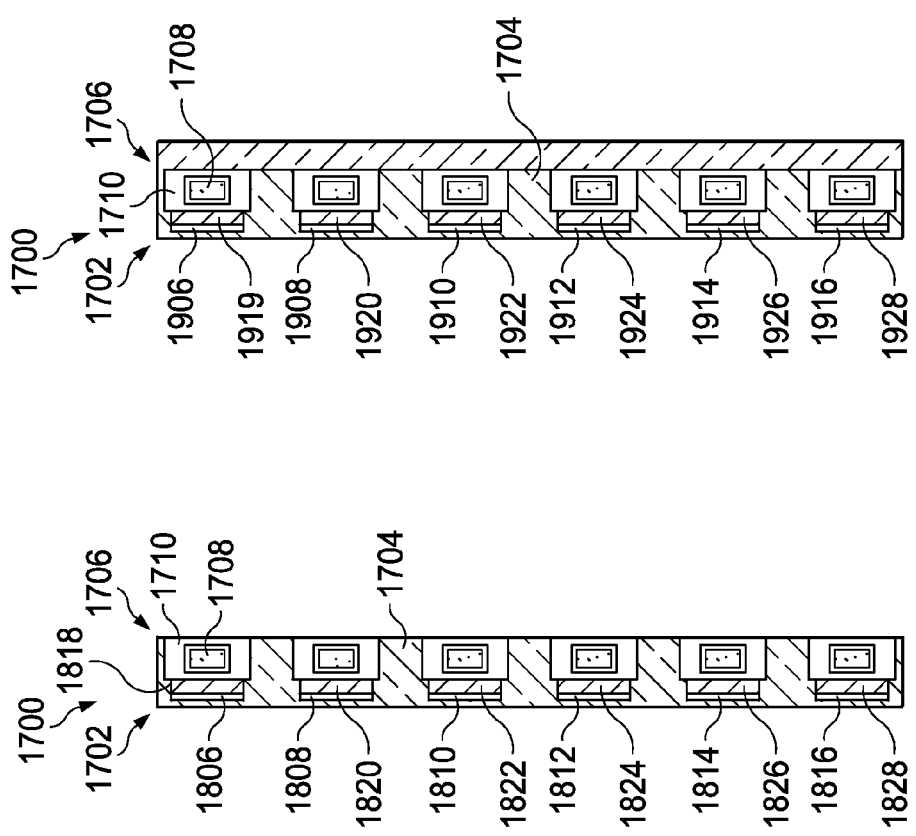

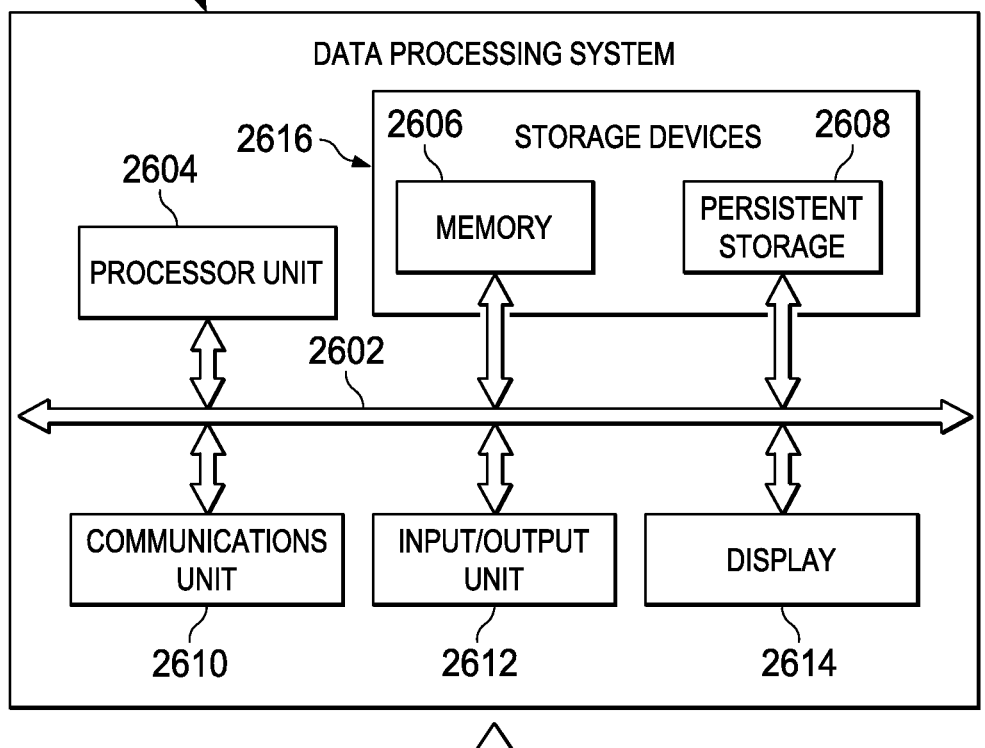
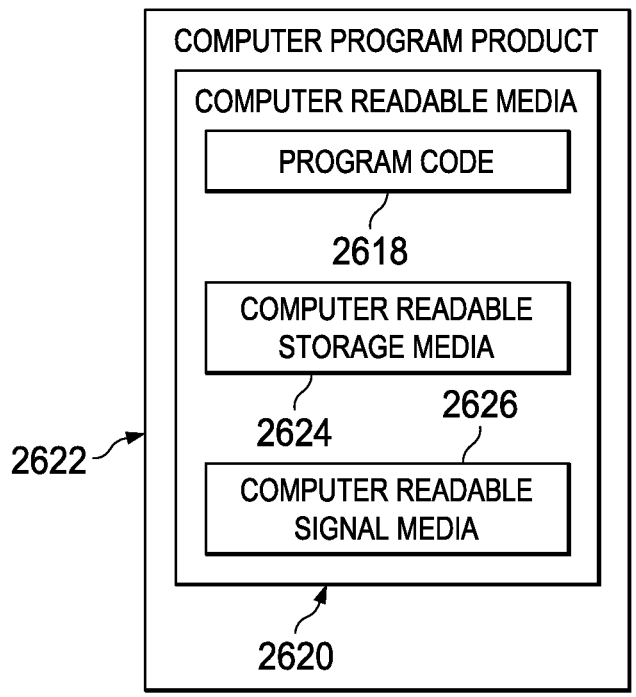
FIG. 26

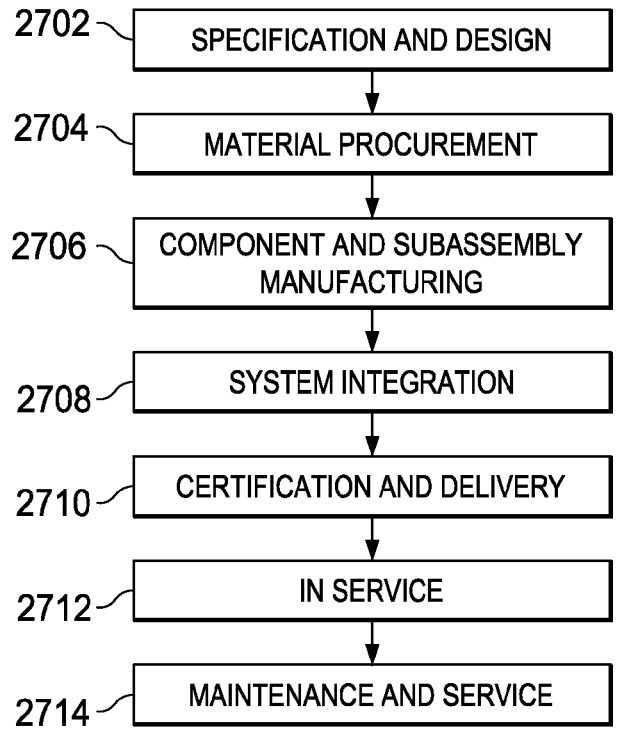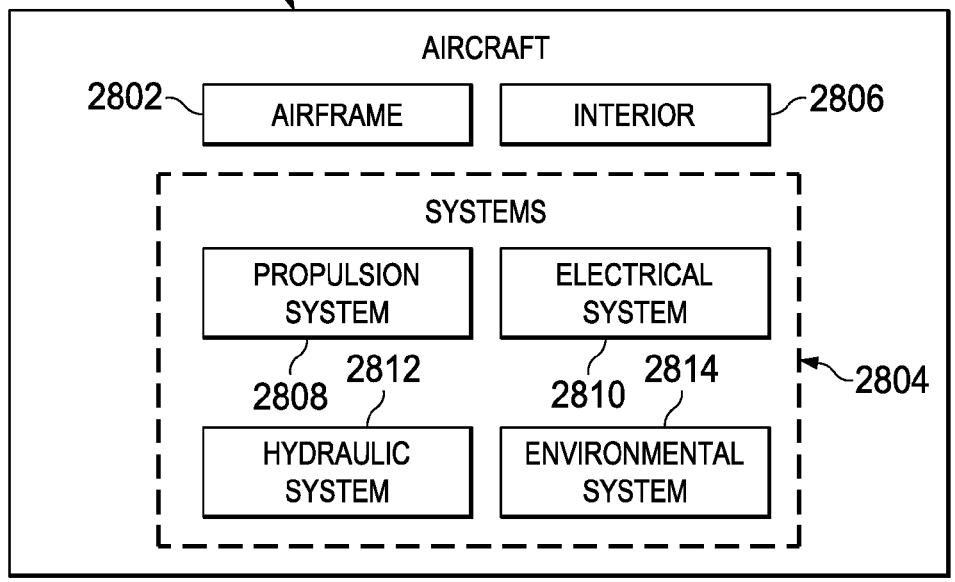

EXTERIOR AIRCRAFT DISPLAY SYSTEM

CROSS-REFERENCE TO RELATED APPLICATION

This application is a continuation-in-part of prior U.S. patent application Ser. No. 13/603,040, filed Sep. 4, 2012, and entitled "Exterior Aircraft Display System," which is incorporated herein by reference in its entirety.

BACKGROUND INFORMATION

1. Field

The present disclosure relates generally to aircraft and, in particular, to displaying information on an aircraft. Still more particularly, the present disclosure relates to a method and apparatus for displaying information on the exterior of an aircraft.

2. Background

Advertisements and other messages are typically placed in advertising spaces in fixed locations. Advertisements are commonly found on billboards, buildings, and other structures. Advertisers have included other systems, other than those in fixed locations, for increasing the visibility of advertisements and other messages.

For example, advertisements are often placed on moving vehicles. These vehicles include buses, taxicabs, airplanes, and other suitable types of vehicles. In some cases, trucks have been used solely for the purpose of acting as a mobile billboard. With advertisements on vehicles, these advertisements can be seen in many more areas than may otherwise be possible based on restrictions or costs for more traditional types of advertisements.

For example, advertisements may be painted on the surface of an aircraft. In other cases, the advertisements may be placed onto the surface of an aircraft in the form of an appliqué. These types of advertisements, however, are static and cannot be easily changed on an aircraft. As a result, when the aircraft is used in different locations, the advertisements on an aircraft may not be as effective for a particular audience that may view the advertisements in those one or more locations. Therefore, it would be desirable to have a method and apparatus that takes into account at least some of the issues discussed above, as well as other possible issues.

SUMMARY

In one illustrative embodiment, an apparatus comprises pixels, a protective layer associated with the pixels, and a conductive path in the protective layer that transfers heat. The protective layer is substantially transparent in areas over the pixels. The pixels, the protective layer, and the conductive path form a display unit for an aircraft.

In another illustrative embodiment, a method for displaying information is presented. The information is sent from a number of sources to a display unit. The information is displayed through pixels located in the display unit. Heat is transferred in the display unit through a conductive path.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 18 is an illustration of a cross-sectional view of a display system in accordance with an illustrative embodiment;

FIG. 19 is an illustration of another cross-sectional view of a display unit with a cooling system in accordance with an illustrative embodiment;

FIG. 20 is an illustration of another cross-sectional view of a display unit with a cooling system in accordance with an illustrative embodiment;

FIG. 21 is an illustration of another cross-sectional view of a display unit with a cooling system in accordance with an illustrative embodiment;

FIG. 26 is an illustration of a block diagram of a data processing system in accordance with an illustrative embodiment;

FIG. 27 is an illustration of a block diagram of an aircraft manufacturing and service method in accordance with an illustrative embodiment; and FIG. 28 is an illustration of a block diagram of an aircraft in which an illustrative embodiment may be implemented.

DETAILED DESCRIPTION

The illustrative embodiments recognize and take into account one or more different considerations. For example, the illustrative embodiments recognize and take into account that one manner in which dynamic displays may be provided for the exterior of an aircraft is through the use of projectors. These projectors may use bright lights or lasers to display information on the exterior surface of the aircraft.

The illustrative embodiments recognize and take into account, however, that the locations where projectors may be placed on an aircraft to project information on the exterior surface of an aircraft may be limited based on design, safety, and other considerations with respect to the aircraft. As a result, the locations of these display systems may reduce the quality of the image in which the information is displayed.

Further, in addition to constraints on locations where the projectors can be placed, the exterior surface of the aircraft may include artifacts or may have coatings that may reduce the quality of the image that may be displayed on the exterior surface of the aircraft. Also, the display of information on the exterior surface of the aircraft may be hindered during some environmental conditions, such as rain, fog, dust, or other undesirable environmental conditions.

Thus, the illustrative embodiments provide a method and apparatus for displaying information on the exterior surface of an aircraft. In one illustrative embodiment, an apparatus comprises a support structure for an aircraft and a display panel associated with the support structure on the exterior of the aircraft. The display panel is configured to display information on the display panel on the exterior surface of the aircraft.

Figure 1:
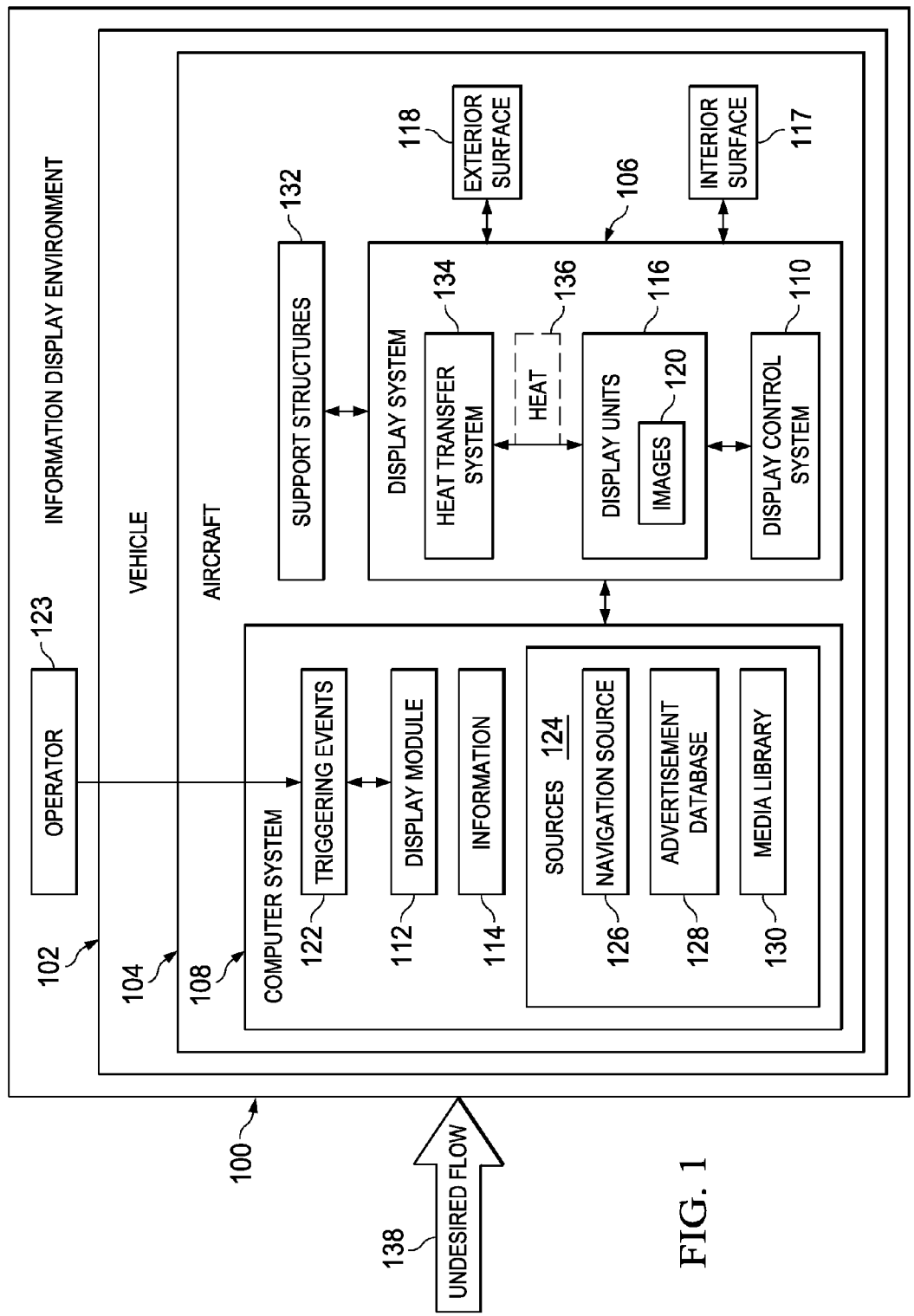
FIG. 1 is an illustration of a block diagram of an information display environment in accordance with an illustrative embodiment.

With reference now to the figures and, in particular, with reference to FIG. 1, an illustration of a block diagram of an information display environment is depicted in accordance with an illustrative embodiment. In this illustrative example, an information display environment 100 includes a vehicle 102 in the form of an aircraft 104.

In this illustrative example, a display system 106 may comprise a display control system 110, a number of display units 116, and a heat transfer system 134. As used herein, a "number of" when used with reference to items means one or more items. For example, a number of display units 116 is one or more display units 116.

A computer system 108 in the aircraft 104 is configured to interface with different systems on the aircraft 104. As depicted, the computer system 108 comprises a number of computers and is located in the aircraft 104. For example, the computer system 108 may include computers for a navigation system, an engine indications and crew alerting system, an in-flight entertainment system, a terrain and ground feature interactive passenger application, and other computers for other suitable types of systems. In these illustrative examples, the computer system 108 is in communication with the display system 106.

As depicted, a display module 112 may comprise at least one of a processor unit or a computer in the computer system 108. The display module 112 may receive information 114, identify information 114, generate information 114, or some combination thereof. The display module 112 may send the information 114 to the display system 106 for display on the exterior surface 118 of the aircraft 104 by the number of display units 116. In these illustrative examples, information 114 may be displayed on the exterior surface 118 of the aircraft 104 via the display module 112.

Additionally, one or more of display units 116 may be located on interior surface 117 of aircraft 104. Information 114 also may be displayed to passengers, crew members, and other people located in interior surface 117 of aircraft 104. For example, display units 116 may be located in a passenger cabin, a galley, a doorway, or some other suitable location on interior surface 117 of aircraft 104.

In these illustrative examples, the display module 112 may be implemented using hardware, software, or a combination of the two. When software is used, the operations performed by the display module 112 may be implemented in program code configured to be run on a processor unit. When hardware is employed to implement the display module 112, the hardware may include circuits that operate to perform the operations in the display module 112.

In these illustrative examples, the hardware may take the form of a circuit system, an integrated circuit, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations.

Examples of programmable logic devices include, for example, a programmable logic array, a programmable array logic, a field programmable logic array, a field programmable gate array, and other suitable hardware devices. Additionally, the processes may be implemented in organic components integrated with inorganic components and/or may be comprised entirely of organic components excluding a human being. For example, the processes may be implemented as circuits in organic semiconductors.

In these illustrative examples, the information 114 may be used to generate images 120 for display by the number of the display units 116 in the display system 106 on the exterior surface 118 of the aircraft 104. In this illustrative example, images 120 may be generated by various components. For example, the display module 112, the display control system 110, the number of the display units 116, or some combination thereof may generate the images 120 displayed by the number of the display units 116 in the display system 106 on the exterior surface 118 of the aircraft 104 from the information 114. In some cases, the information 114 may include the images 120.

The generation of the images 120 for display on the number of display units 116 may be controlled using triggering events 122. The triggering events 122 may be periodic or non-periodic events and may be obtained using the information 114. In these illustrative examples, the triggering events 122 include any information that may be used by the computer system 108 to determine when, how, and where the number of display units 116 display the images 120 on the exterior surface 118 of the aircraft 104.

For example, the triggering events 122 may include a phase of flight of the aircraft 104. Based on the phase of flight, the display module 112 may select one or more of the images 120 for use in the display of the images 120 on the exterior surface 118 of the aircraft 104 by the number of display units 116. As another example, if a message is received from the airport at which the aircraft 104 is located, that message may be used to generate an image in the images 120 for display on the exterior surface 118 of the aircraft 104. For example, the message may refer to a result of an athletic event that may be included in the images 120 that are displayed on the exterior surface 118 of the aircraft 104.

Further, the triggering events 122 also may include an indication that the aircraft 104 is approaching an airport gate, beginning a taxiing phase, initiating engine start, initiating hydraulics pressurization, or other suitable information that may be used to select the images 120 for display on the exterior surface 118 of the aircraft 104. The triggering events 122 also may include location specific information in the information 114 used by the display module 112. This location of the aircraft 104 may be used to identify advertising, logos, and/or other suitable types of the information 114 that may be used to generate or select the images 120.

As another example, the triggering events 122 may include those initiated or selected by the operator 123. The operator 123 may be a pilot or other crew member. The operator 123 also may be a ground crew member in these illustrative examples. In yet another illustrative example, the triggering events 122 may be the activity of the operator 123 in the cabin of the aircraft 104. The operator 123 may be a crew member or a passenger in the cabin of the aircraft 104. In these illustrative examples, the display system 106 may be controlled partially or completely by the operator 123.

In these illustrative examples, the communication between components such as the computer system 108 and the display system 106 may be performed over existing communications links established using different types of communications media. The communications media may include, for example, without limitation, wires, fiber optic cables, wireless communications links, and other suitable types of media. The communications links may be unidirectional, bidirectional, or a combination of the two.

In these illustrative examples, the information 114 may take various forms. For example, the information 114 may be selected from at least one of a logo, a trademark, an advertisement, a tail number, safety information, flight information, baggage claim information, ground crew information, gate information, a direction blinker, a navigation light, warning information, or other suitable types of information.

As used herein, the phrase "at least one of", when used with a list of items, means different combinations of one or more of the listed items may be used and only one of each item in the list may be needed. For example, "at least one of item A, item B, or item C" may include, without limitation, item A or item A and item B. This example also may include item A, item B, and item C or item B and item C. In other examples, "at least one of" may be, for example, without limitation, two of item A, one of item B, and ten of item C; four of item B and seven of item C; or other suitable combinations.

In these illustrative examples, the information 114 may originate from different sources onboard the aircraft 104, off of the aircraft 104, or some combination thereof. For example, the information 114 may include information about the airport, the city in which the airport is located, events occurring in the city in which the airport is located, or some combination thereof.

When the information 114 originates within the aircraft 104, the information 114 may be received from a number of sources 124 in the computer system 108. The number of sources 124 may be at least one of a navigation source 126, an advertisement database 128, a media library 130, or other suitable sources.

When the information 114 originates from the navigation source 126, the information 114 may include information about at least one of fuel levels, direction of travel of the aircraft 104, or other suitable information about the aircraft 104. The advertisement database 128 may include information 114 such as images 120. The images 120 may be still images for an advertisement. In other examples, the images 120 may be part of a video for an advertisement. The information 114 in the media library 130 may be, for example, without limitation, information about the airline, information about a destination location for a flight, and other suitable types of information.

In these illustrative examples, the display module 112 is configured to control the display of the images 120 by the number of display units 116 associated with the exterior surface 118 of the aircraft 104. When one component is "associated" with another component, the association is a physical association in the depicted examples. For example, a first component, the number of display units 116, may be considered to be associated with a second component, the exterior surface 118 of the aircraft 104, by being secured to the second component, bonded to the second component, mounted to the second component, welded to the second component, fastened to the second component, and/or connected to the second component in some other suitable manner. The first component also may be connected to the second component using a third component. The first component may also be considered to be associated with the second component by being formed or manufactured as part of and/or an extension of the second component. For example, the display module 112 may select the information 114.

In these illustrative examples, the number of display units 116 is associated with a number of support structures 132 on the exterior surface 118 of the aircraft 104. In these illustrative examples, the number of the display units 116 are associated with the exterior surface 118 of the aircraft 104 such that the number of the display units 116 are substantially flush to the exterior surface 118 of the aircraft 104.

In other words, if the exterior surface 118 of the aircraft 104 is substantially flat, the number of display units 116 maintains that substantially flat surface on the exterior surface 118 of the aircraft 104. If the exterior surface 118 of the aircraft 104 has a curve, the number of display units 116 at that location has a similar curve such that a display unit, when associated with the exterior surface 118 of the aircraft 104, maintains that curve desired for the aircraft. In this manner, aerodynamic properties of the aircraft 104 for the exterior surface 118 of aircraft 104 may remain at a desired level of performance.

The heat transfer system 134 is configured to transfer heat 136 with respect to the number of display units 116. In other words, heat 136 may be conducted away from the number of display units 116 or toward the number of display units 116 depending on the particular implementation. The heat transfer system 134 also may direct heat away from the display system 106, the computer system 108, and other electronics within the number of display units 116.

For example, heat 136 may be conducted away from the number of display units 116 to provide cooling for the number of display units 116. In other illustrative examples, heat 136 may be conducted toward the number of display units 116 to provide heating if the number of display units 116 are colder than desired. In this manner, the heat transfer system 134 may provide a desired operating temperature for the number of display units 116.

The number of the display units 116 is associated with the aircraft 104 in a manner that reduces undesired airflow 138 when the aircraft 104 is in flight. The undesired airflow 138 may result in an increase in the aerodynamic drag. For example, the number of the display units 116 may be associated with the aircraft 104 in a manner such that the number of the display units 116 is substantially flush to the exterior surface 118 of the aircraft 104.

Although the illustrative examples for an illustrative embodiment are described with respect to the aircraft 104, an illustrative embodiment may be applied to other types of platforms. The platform may be, for example, a mobile platform, a stationary platform, a land-based structure, an aquatic-based structure, and a space-based structure. More specifically, the platform, may be a surface ship, a tank, a personnel carrier, a train, a spacecraft, a space station, a satellite, a submarine, an automobile, a power plant, a bridge, a dam, a house, a manufacturing facility, a building, and other suitable platforms.

Figure 2:
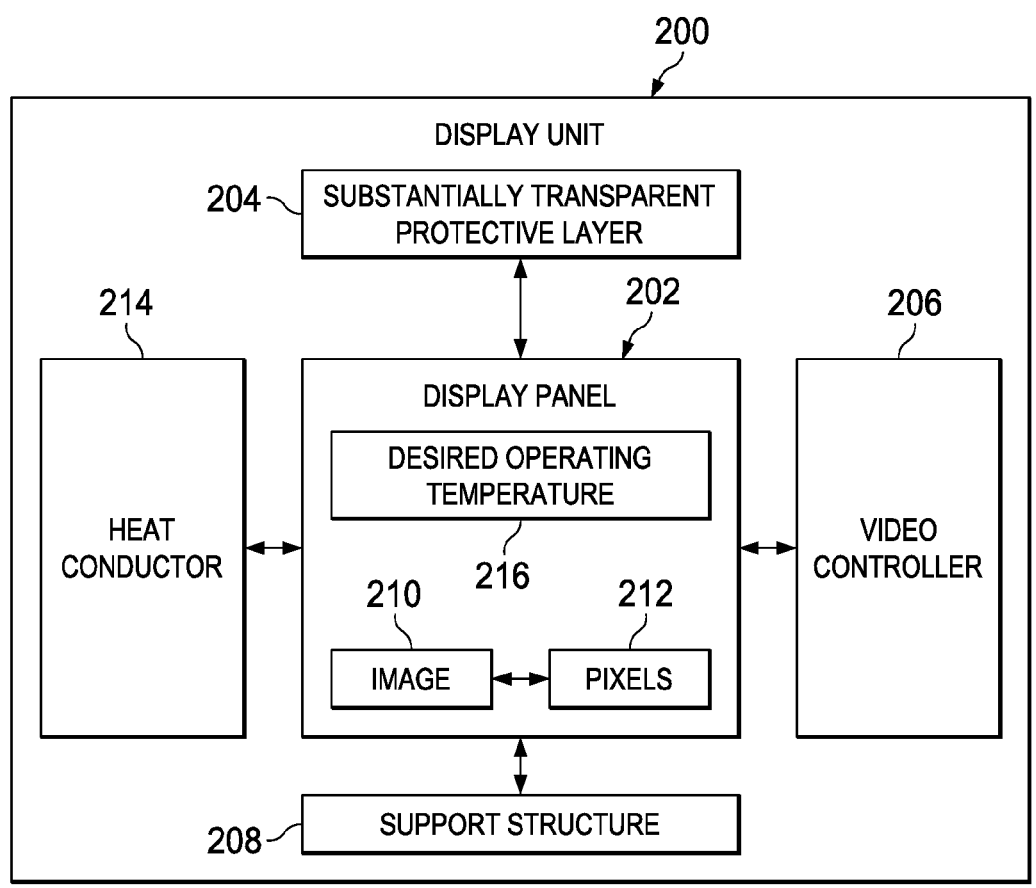
FIG. 2 is an illustration of a block diagram of a display unit in accordance with an illustrative embodiment.

With reference now to FIG. 2, an illustration of a block diagram of a display unit is depicted in accordance with an illustrative embodiment. The display unit 200 illustrated in this figure is an example of a display unit that may be used in the number of display units 116 in the display system 106 for the aircraft 104 in FIG. 1.

In this illustrative example, the display unit 200 may include a display panel 202, a substantially transparent protective layer 204, a video controller 206, and a support structure 208. The display panel 202 is a hardware device that is configured to display the information 114 from FIG. 1. In particular, the display panel 202 may display an image 210. The image 210 may be generated from the information 114 in FIG. 1. The display panel 202 may be embedded within the exterior surface 118 of the aircraft 104 in FIG. 1.

In this illustrative example, the display panel 202 may be implemented using a number of different types of display technologies. For example, the display panel 202 may be selected from at least one of a light-emitting diode display, an organic light-emitting diode display, a plasma display, a quantum dot display, a liquid crystal display, or other suitable types of display devices.

Further, the display panel 202 may be a structural member of the airframe or skin. The display panel 202 may be located in at least one of a fuselage, a wing, a winglet, a horizontal stabilizer, a vertical stabilizer, an engine housing, or in some other suitable location. Moreover, the display panel 202 may have portions or segments. These portions or segments of the display panel 202 may be logically separated, or may display a number of different images substantially concurrently without a physical separation.

In other words, different segments in the display panel 202 may have different images. For example, the display panel 202 may have two segments configured to display two different images substantially concurrently. The display panel 202 may also display a contiguous image across each segment in the display panel 202.

In this manner the display unit 200 may display these two images or more images substantially concurrently without a physical separation in the display panel 202. Of course, other numbers of images may be displayed in segments of the display panel 202 depending on the particular implementation. In some illustrative examples, the display unit 200 may have one or more display panels in addition to the display panel 202 that form the portions of segments for displaying images.

The substantially transparent protective layer 204 is configured to be placed over the display panel 202. The substantially transparent protective layer 204 is configured to protect the display panel 202 from the environment around the aircraft 104 in FIG. 1.

The substantially transparent protective layer 204 may take various forms. For example, the substantially transparent protective layer 204 may be comprised of a material selected from at least one of glass, a polycarbonate, a composite material or other suitable materials. Further, in these illustrative examples, the substantially transparent protective layer 204 may have various properties such as polarization, filtering frequencies of light, and other suitable properties. In some illustrative examples, the substantially transparent protective layer 204 may be a lens.

The video controller 206 is a hardware device configured to control the operation of pixels 212 on the display panel 202 to display the image 210 on the display panel 202. The video controller 206 may take various forms. For example, the video controller 206 may be a graphics card, a computer, video driver, a processor unit, or some other suitable device. The video controller 206 may also provide power for the pixels 212 in addition to controlling the image 210 displayed on the display panel 202.

The support structure 208 is configured to provide support for the display panel 202. In these illustrative examples, the support structure 208 may be a frame, a housing, or some other suitable type of structure. For example, the support structure 208 may be located in or selected from at least one of a fuselage, a wing, a winglet, a horizontal stabilizer, a vertical stabilizer, an engine housing, or some other suitable location. In some illustrative examples, the substantially transparent protective layer 204 may be considered all or part of the support structure 208 and/or a cooling system. In other illustrative examples, the substantially transparent protective layer 204 may be integrated in the display panel 202.

In these illustrative examples, the video controller 206 may be associated with the support structure 208. In other illustrative examples, the video controller 206 may be located in a separate location from the support structure 208 and the display panel 202.

For example, the video controller 206 and the display panel 202 may both be in different locations in a winglet or wingtip of the aircraft 104 in FIG. 1. When the video controller 206 is in a separate location from the support structure 208 and the display panel 202, the video controller 206 may be in communication with the display panel 202 using a wire, a wireless communications link, an optical fiber, or some other suitable medium. For example, the communications link may be made using a flat serial cable between the video controller 206 and the display panel 202 for the display unit 200.

In these illustrative examples, the support structure 208 with the substantially transparent protective layer 204 is configured to be connected to the aircraft 104 in a manner that reduces the undesired airflow that may occur. As depicted, a heat conductor 214 is configured to aid in providing a desired operating temperature 216 for the display panel 202 and other components in the display unit 200, the display system 106 in FIG. 1, and the computer system 108 as required in other illustrative examples.

The heat conductor 214 may transfer heat away from the display panel 202, the display system 106, and the computer system 108 to maintain the display panel 202 at the desired operating temperature 216. In other illustrative examples, when the environment is colder than desired, the heat conductor 214 may transfer heat to the display panel 202 to maintain the desired operating temperature 216 for the display panel 202.

In these illustrative examples, the heat conductor 214 may be implemented using any structure that is configured to conduct heat. For example, without limitation, the heat conductor 214 may be comprised of a metal, a ceramic, a composite, and other suitable materials. The heat conductor 214 also may take various forms. For example, the heat conductor 214 may be a fin, a mesh, or some other suitable structure that is configured to provide a path for heat transfer to the display panel 202, from the display panel 202, or some combination thereof.

In these illustrative examples, the heat conductor 214 may be thermally connected to the heat transfer system 134 in FIG. 1. In other illustrative examples, the heat conductor 214 may form the heat transfer system 134 in FIG. 1. Further, the heat conductor 214 may serve as an electrical conductor as well as an electrical ground for components in the display unit 200, the display system 106, the computer system 108, or other components in these illustrative examples. Moreover, the heat conductor 214 may be integrated as part of the aircraft structure.

The illustrations of the information display environment 100 in FIG. 1 and example components for the display unit 200 in FIG. 2 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, in some illustrative examples, the support structure 208 may not be part of the display unit 200. Instead, the support structure 208 may be a structure in the aircraft 104. For example, the support structure 208 may be the fuselage, a skin panel, or other structure in the aircraft 104 in FIG. 1. In still other illustrative examples, the video controller 206 may be connected to the support structure 208 along with the display panel 202.

In another illustrative example, the computer system 108 may be integrated with the display system 106 in FIG. 1. As another example, the computer system 108 may be integrated with the video controller 206.

In still another illustrative example, the information display environment 100 in FIG. 1 may include a second aircraft with a second display system. The display system 106 in the aircraft 104 may display information 114 in FIG. 1 in coordination with the display of information by the second aircraft. For example, if the aircraft 104 and the second aircraft are lined up by each other at gates or on a taxiway, the display of information 114 and/or animation of information 114 by the aircraft 104 in FIG. 1 and the second aircraft may be coordinated with each other.

As another example, information 114 may be passed between multiple aircraft to be displayed on each aircraft in a rolling pattern such that information 114 from one aircraft is then seen on a neighboring aircraft, and so on. In other words, parts or all of the same information 114 may be displayed on different aircraft lined up at the gate in a time-coordinated or rolling manner such that viewers see information 114 in a desired manner on multiple aircraft. Information 114 may also be sent from or displayed upon aircraft to aircraft in a progressive manner or in pulses, depending on the particular implementation.

As another example, portions of the computer system 108 and the information 114 may be located in different locations in aircraft 104. For example, portions of the computer system 108 and the information 114 may be located in an in-flight entertainment system in the aircraft 104. Also, the information 114 may be located in a location remote to the aircraft 104 and sent to the aircraft 104.

Figure 3:
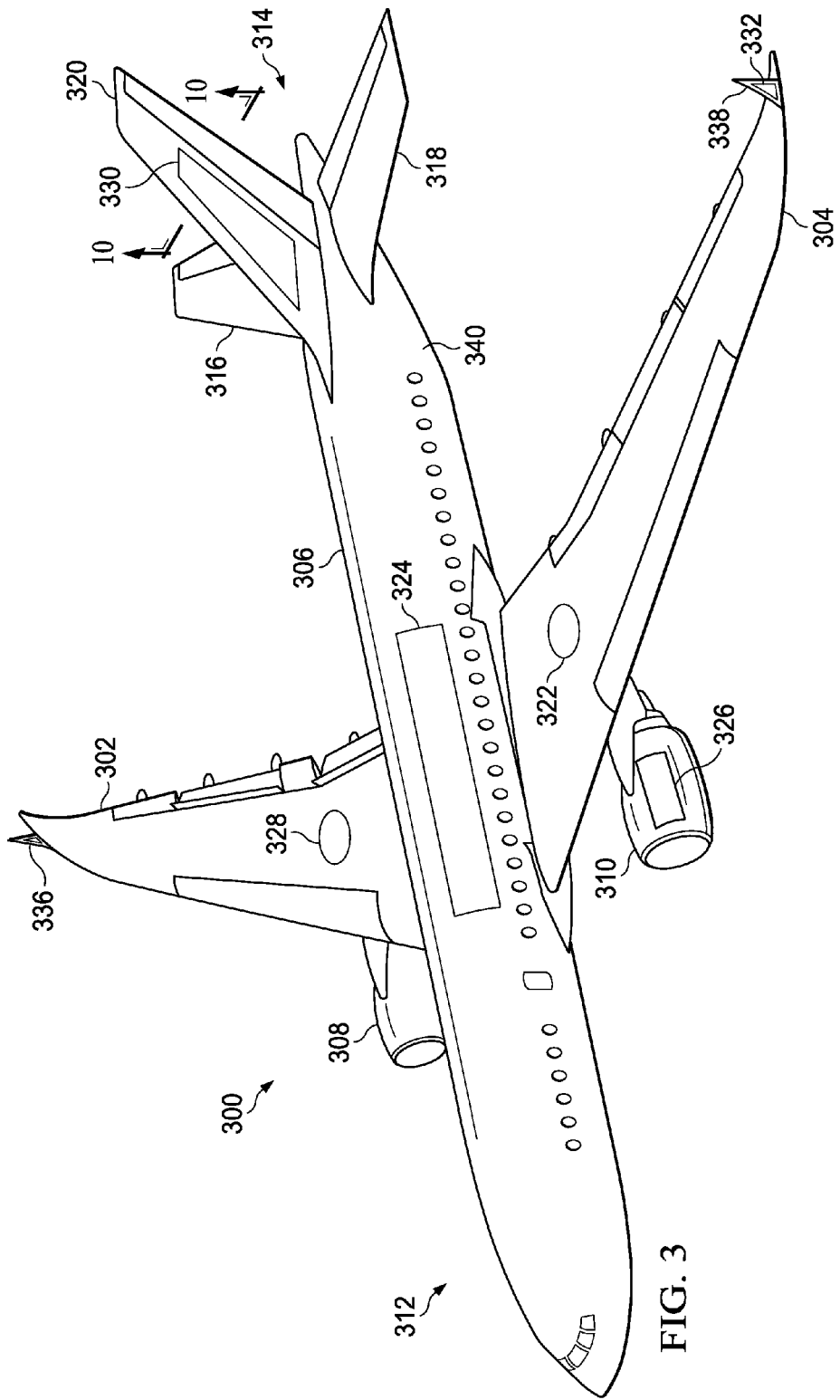
FIG. 3 is an illustration of an aircraft in accordance with an illustrative embodiment.

With reference now to FIG. 3, an illustration of an aircraft is depicted in accordance with an illustrative embodiment. In this depicted example, an aircraft 300 is an example of a physical implementation for the aircraft 104 shown in block form in FIG. 1.

In this illustrative example, the aircraft 300 has a first wing 302 and a second wing 304 attached to a fuselage 306. The aircraft 300 includes a first engine 308 attached to the first wing 302 and a second engine 310 attached to the second wing 304.

The fuselage 306 has a nose section 312 and a tail section 314. A first horizontal stabilizer 316, a second horizontal stabilizer 318, and a vertical stabilizer 320 are attached to the tail section 314 of the fuselage 306.

In these illustrative examples, display units 322, 324, 326, 328, 330, and 332 can be seen on the aircraft 300. The display units 322, 324, 326, 328, 330, and 332 are examples of physical implementations for the number of display units 116 shown in block form in FIG. 1.

As depicted, the display units 322, 324, 326, 328, 330, and 332 may be implemented using the display unit 200 in FIG. 2. As depicted, the display units 322, 324, 326, 328, 330, and 332 are mounted on an exterior surface 340 of the aircraft 300. In particular, the display units 322, 324, 326, 328, 330, and 332 are mounted to be substantially flush to the exterior surface 340 of the aircraft 300. In other words, the display units 322, 324, 326, 328, 330, and 332 may be embedded within the exterior surface 340 of the aircraft 300. In this manner, undesired airflow on the aircraft 300 may be reduced or avoided.

As depicted, a display unit 322 is located on the second wing 304. A display unit 324 is located the fuselage 306. A display unit 326 is located on the second engine 310. A display unit 328 is located on the first wing 302, while a display unit 330 is located on the vertical stabilizer 320.

In this illustrative example, the first wing 302 has a first winglet 336 and the second wing 304 has a second winglet 338. In these illustrative examples, the first winglet 336 and the second winglet 338 are wing tip or wing surface structure extensions to the first wing 302 and the second wing 304, respectively.

The first winglet 336 and the second winglet 338 are configured to add desirable aerodynamic performance. For example, the first winglet 336 and the second winglet 338 may reduce lift induced drag and may provide additional lift to the aircraft 300. As depicted, a display unit 332 is located on the second winglet 338. The location of the display unit 332 on the second winglet 338 may be desirable due to the visibility of the second winglet 338.

The illustration of the display units 322, 324, 326, 328, 330, and 332 on the aircraft 300 in FIG. 3 is only an example of some locations where the display units 322, 324, 326, 328, 330, and 332 may be located. Additional display units also may be present on the aircraft 300, but not seen in this view. For example, a display unit also may be located on the first engine 308, the first winglet 336, the other side of the vertical stabilizer 320, or in some other suitable location on the aircraft 300. In yet another example, another display unit may be located on the other side of the fuselage 306 opposite to the display unit 324 as seen on the fuselage 306 upon other structures not seen in this view.

In other illustrative examples, fewer numbers of the display units 322, 324, 326, 328, 330, and 332 may be used on the aircraft 300. For example, only the display unit 332 on the second winglet 338 and a display unit (not shown) on the first winglet 336 may be used. Further, while the display units 322, 324, 326, 328, 330, and 332 may all be present on the aircraft 300, not all of the display units 322, 324, 326, 328, 330, and 332 may be used substantially concurrently.

In other illustrative examples, the display unit 332 may be seen on multiple sides of an aircraft structure. For example, the display unit 332 may be transparent and display the images 120 on both sides substantially concurrently.

Figure 4:
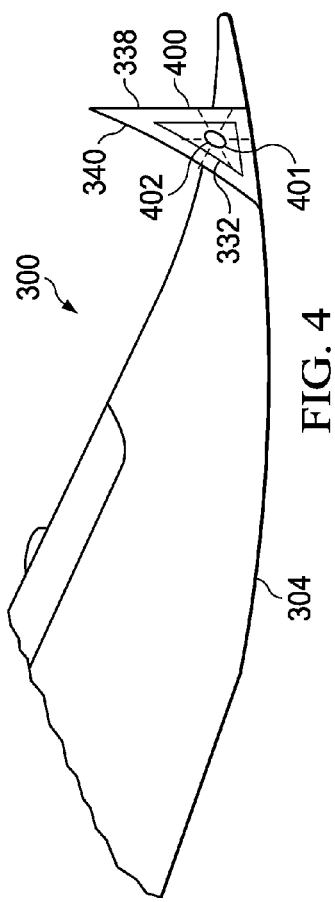
FIG. 4 is an illustration of a portion of the second wing of the aircraft in FIG. 3 with the second winglet in accordance with an illustrative embodiment.

Turning now to FIG. 4, an illustration of a portion of the second wing 304 of the aircraft 300 with the second winglet 338 is depicted in accordance with an illustrative embodiment. As depicted, the display unit 332 on the second winglet 338 is substantially flush to the exterior surface 340 of the aircraft 300.

In particular, the display unit 332 may be constructed to have a shape that corresponds to the shape for the exterior surface 340 of the aircraft 300 on the second winglet 338 when the display unit 332 is used on the second winglet 338. The display unit 332 may comprise part of or all of the second winglet 338. In particular, the display unit 332 may be made as an integral part of the second winglet 338. More specifically, the display unit 332 is located on the outboard side 400 of the exterior surface 340 of the second winglet 338 of the aircraft 300.

In this illustrative example, the display unit 332 displays information in an image 401. In this illustrative example, the image 401 is in the form of a navigation light 402. In other words, the display unit 332 may display different colors in the image 401 of the navigation light 402 as a navigation aid. For example, the navigation light 402 displayed on the display unit 332 may be a color selected from one of red, white, green, or some other suitable color. Further, the display units 116 in FIG. 1 may act as a directional spotlight with or without a mechanical or refractive lens or may also be used as a flood light.

Further, the navigation light 402 displayed on the display unit 332 also may be animated, flashed, strobed, or a combination thereof depending on the particular implementation. In other illustrative examples, operating the navigation light 402 in a strobed or animated manner may provide communication between aircraft. For example, the aircraft 300 may communicate by Morse code or other types of code, symbolic text, or some combination thereof using the navigation light 402.

The navigation light 402 displayed on the display unit 332 may be displayed during various phases of operation of the aircraft. For example, the navigation light 402 may be displayed during taxiing, takeoff, ascent, level flight, descent, and landing while aircraft is stationary or moving.

Further, the display unit 332 may change the display to display other types of information during other phases of aircraft operation. For example, information in the form of advertisements, logos, ground operations, maintenance and repair information, and other suitable types of information may be displayed in the form of images and symbols on the display unit 332 when the aircraft 300 is at a gate, in some other location, or in motion. In this example, information may be displayed on the display unit 332 while the navigation light 402 is operation and/or while the navigation light 402 is not operating. In another example, the display unit 332 may function as a directional blinker to indicate a turn for the aircraft 300 in FIG. 3.

Additionally, in some illustrative examples, the display unit 332 may be oriented such that a particular audience may view the display unit 332. The display unit 332 may be dynamically oriented for passengers to view the image 401. In other words, the orientation of display unit 332 may change physically or the image 401 may be displayed in a manner to provide a desired view of the image 401 at the orientation viewed by the passengers.

For example, when the aircraft 104 is flying close to the ground or close to another aircraft, the image 401 in display unit 332 may be oriented such that people on the ground may see the image 401. The aircraft 104 in FIG. 1 is considered to be close to the ground when a person on the ground, inside a building, or both is able to view the display unit 332 as clearly as desired. The aircraft 104 is considered to be close to another aircraft when a person in the second aircraft is able to view the display unit 332 as clearly as desired.

Although the display unit 332 on the second winglet 338 may be located on the top of the wing 304 in these illustrative examples, other orientations for the display unit 332 on the second winglet 338 or on an additional winglet may be present. For example, the display unit 332 on the second winglet 338 may be connected to the bottom of the wing 304 and be oriented downward.

In other illustrative examples, the display unit 332 on the second winglet 338 may be present with an additional display unit on a winglet connected to the bottom of the wing 304. In other words, the depicted examples of the display unit 332 on the second winglet 338 do not limit the orientation or configuration of the display unit 332.

Further, more than one display panel in the display unit 332 may be present on the second winglet 338. For example, the display unit 332 may have one panel, two panels, five panels, or some other suitable number of panels in these illustrative examples. As a result, in some illustrative embodiments, images may be displayed on at least one side of the second winglet 338 or on other winglets of the aircraft 300.

Figure 5:
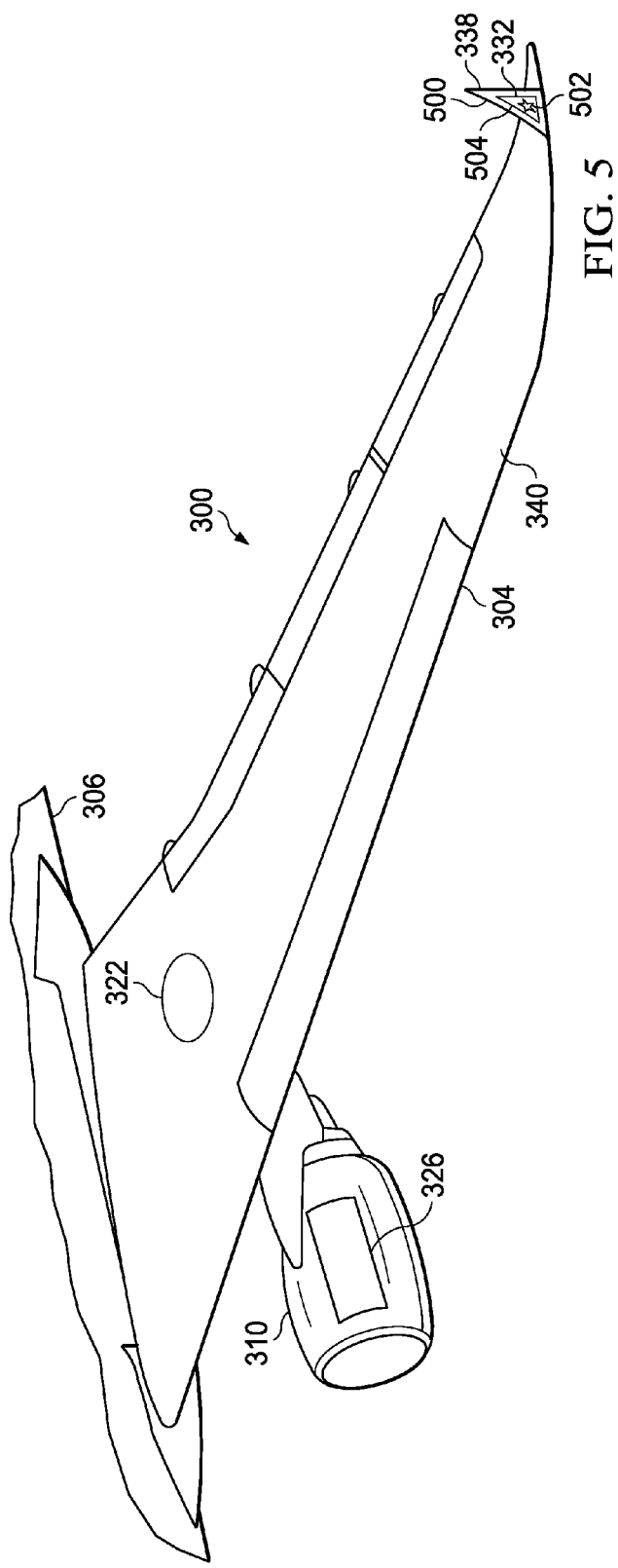
FIG. 5 is an illustration of another view of a portion of the second wing of the aircraft in FIG. 3 with the second winglet in accordance with an illustrative embodiment.

Turning now to FIG. 5, an illustration of another view of a portion of the second wing 304 of the aircraft 300 with the second winglet 338 is depicted in accordance with an illustrative embodiment. As depicted, the display unit 332 on the second winglet 338 is substantially flush to the exterior surface 340 of the aircraft 300.

As can be seen, the display unit 332 is also present on the inboard side 500 of the second winglet 338 as well as on the outboard side 400 of the second winglet 338 as shown in FIG. 4. In this example, the display unit 332 is a two-sided display unit.

As depicted, the display unit 332 displays an image 502 in the form of a logo 504. In other words, the display of the image 502 on the inboard side 500 may be different from the display of the image 401 on the outboard side 400 of the second winglet 338 in FIG. 4.

In other illustrative examples, another display unit may be used if the display unit 332 is not a two-sided display unit. The particular configuration used for displaying information on the second winglet 338 may vary depending on the particular implementation.

Further, the display unit 332 on the inboard side of the second winglet 338 may also display information to passengers in the aircraft 300 during operation of the aircraft 300 or while the aircraft 300 is stationary on the ground. For example, the display unit 332 may display local ground feature information for the aircraft 300. This information may be displayed based on a triggering event in triggering events 122 in FIG. 1 such as the activity of passengers, crew, or pilots in the aircraft 300, a particular location of the aircraft 300 that may be of interest to the passengers, or based on other trigger events.

Figure 6:
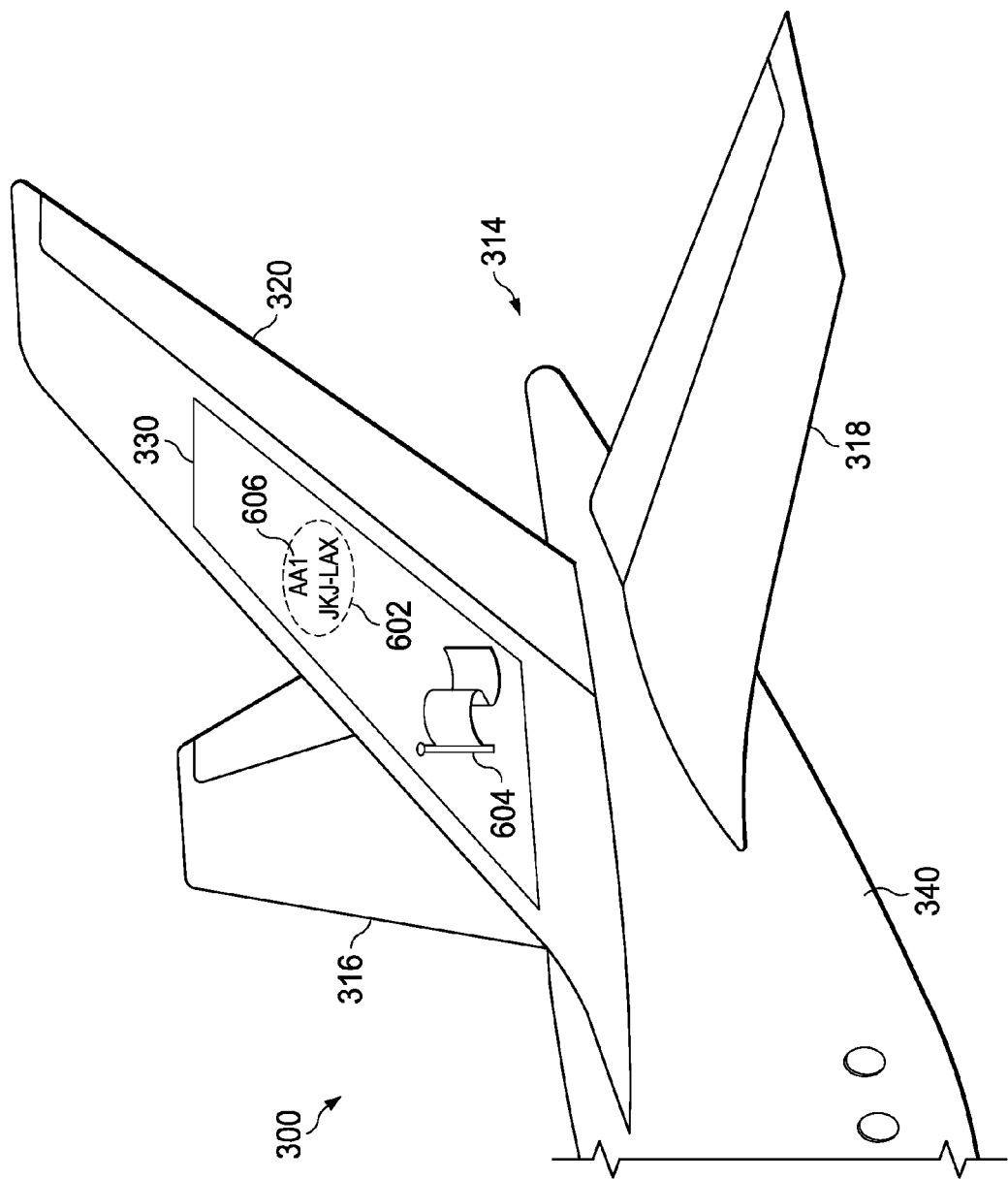
FIG. 6 is an illustration of the tail section of the aircraft in FIG. 3 in accordance with an illustrative embodiment.

Turning now to FIG. 6, an illustration of the tail section 314 of the aircraft 300 in FIG. 3 is depicted in accordance with an illustrative embodiment. As depicted, the display unit 330 on the vertical stabilizer 320 in the tail section 314 of the aircraft 300 in FIG. 3 is mounted to be substantially flush to the exterior surface 340 of the aircraft 300 on the vertical stabilizer 320.

As can be seen in this illustrative example, an image 602 is displayed by the display unit 330 on the vertical stabilizer 320. In this illustrative example, the image 602 includes a flag 604 and a tail number 606. As depicted, the image 602 may be static, dynamic, or a combination thereof. In this illustrative example, the image 602 may dynamically display the flag 604 to show the flag 604 moving as if the wind was passing through the flag 604 in the image 602.

The tail number 606 in the image 602 is a static portion of the image 602. Also, the image 602 may be static or dynamic. In other words, the image 602 may remain the same or may change. For example, the image 602 may be animated such as one generated by a computer. When the image 602 is dynamic, the image 602 may be changed, additional images may be generated and displayed in place of the image 602, or some combination thereof to provide the animation of the flag 604 displayed by the display unit 330.

In other illustrative examples, the image 602 may be video displayed by the display unit 330 that may change the image 602. In other words, new images may be displayed in place of, or simultaneous with, the image 602 with those images originating from a video. Further, the image 602 also may change depending on at least one of the particular locations of the aircraft 300, the phase of flight of the aircraft 300, whether the aircraft 300 is in maintenance or service, whether the aircraft 300 is at a gate or between gates, or based on other conditions or parameters for the aircraft 300.

Further, in some illustrative examples, the display unit 330 may have multiple panels that form segments, one panel with multiple segments, or some combination thereof. In one example, the flag 604 may be displayed on one portion of the display panel in the display unit 330 while the tail number 606 is displayed on another portion of the display panel. In another example, the flag 604 may be displayed on one display panel in the display unit 330 while the tail number 606 is displayed on another display panel in the display unit 330. In other illustrative examples, the flag 604 and the tail number 606 may be displayed over multiple display panels.

Figure 7:
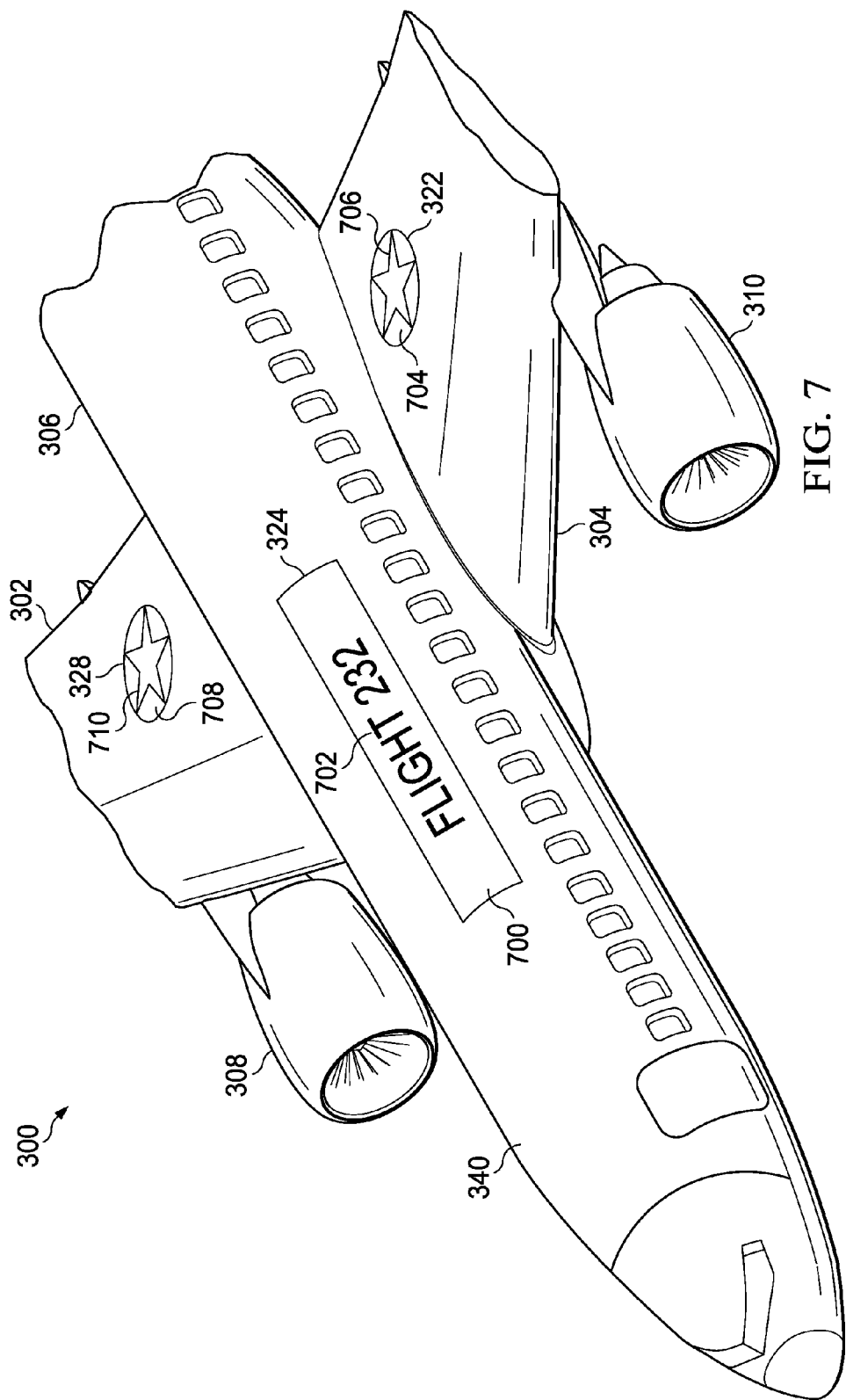
FIG. 7 is an illustration of another portion of the aircraft in FIG. 3 in accordance with an illustrative embodiment.

With reference now to FIG. 7, an illustration of another portion of the aircraft 300 in FIG. 3 is depicted in accordance with an illustrative embodiment. In this illustrative example, a portion of the fuselage 306 with the first wing 302 and the second wing 304 is shown with the display unit 324.

In this example, an image 700 is displayed on the exterior surface 340 of the aircraft 300 on the fuselage 306 by the display unit 324. In this example, the image 700 provides flight information 702 for the aircraft 300. In particular, the flight information 702 displayed in the image 700 by the display unit 324 is a flight number for the aircraft 300.

Additionally, the display unit 322 on the second wing 304 of the aircraft 300 is shown displaying an image 704. In this example, the image 704 takes the form of a logo 706 as displayed by the display unit 328 on the exterior surface 340 of the aircraft 300.

Further, the display unit 328 on the first wing 302 displays an image 708 that also takes the form of a logo 710 as displayed by the display unit 328 on the exterior surface 340 of the aircraft 300. As can be seen in this illustrative example, the display unit 324 on the fuselage 306 is rectangular in shape while the display unit 328 on the first wing 302 and the display unit 322 on the second wing 304 are circular in shape. In other words, any shape may be used depending on the particular implementation.

Figure 8:
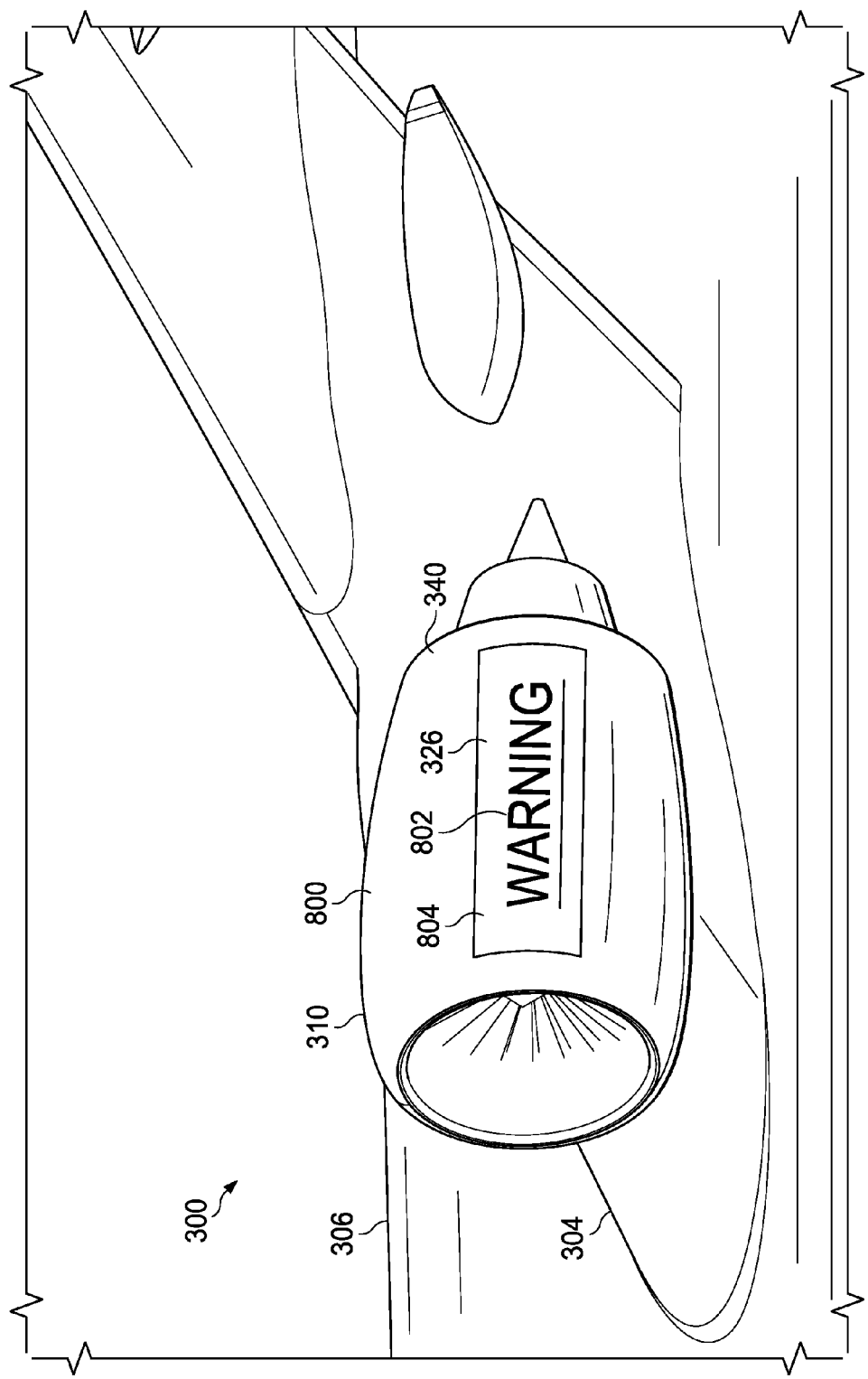
FIG. 8 is an illustration of another portion of the aircraft in FIG. 3 in accordance with an illustrative embodiment.

With reference now to FIG. 8, an illustration of another portion of the aircraft 300 is depicted in accordance with an illustrative embodiment. The display unit 326 is located on nacelle 800 of the second engine 310. An image 802 is displayed on the exterior surface 340 of the aircraft 300 by the display unit 326 on the nacelle 800 of the second engine 310.

In this illustrative example, the image 802 takes the form of information that may be used by maintenance personnel or other personnel when the aircraft 300 is on the ground. In this particular example, the image 802 takes the form of a warning 804. The warning 804 may be used to indicate that that the second engine 310 is about to start, warming up, or otherwise operating.

In this example, the image 802 is generated in a manner that may be conspicuous or attention-getting with respect to maintenance personnel. For example, the image 802 may be displayed in a color, with animation, or other suitable attention-getting features. For example, when a color is used, the color of the image 802 may change. In another illustrative example, the image 802 may strobe, flash, or include an animated graphic with a strobe and/or flash feature.

In other illustrative examples, the image 802 may include other types of information. This other type of information may include, for example, without limitation, graphical instructions, text instructions, symbolic instructions, or some combination thereof that may be animated, scrolling, or stationary, to load cargo or unload cargo. The image 802 may indicate classes, types, load status, current weight position, balance load allowables, priorities, or some combination thereof for cargo or the in-aircraft location of the cargo.

As another example, the image 802 may be graphical instructions, text instructions, symbolic instructions, or some combination thereof that may be animated, scrolling, or stationary to fuel the aircraft 300. In yet another illustrative example, the display of the image 802 may provide ground crew with information including destination gate information, 'blinker' direction indication, confirmation of ground crew-to-aircrew communication, information regarding needed maintenance, repair, and operations, and other crew-commanded communication. These examples are only illustrative examples of some implementations for the display of the images 120 by the display units 116 in FIG. 1 that may be initiated by operator 123 such as a crew member or automatically by the components in FIG. 1.

Figure 9:
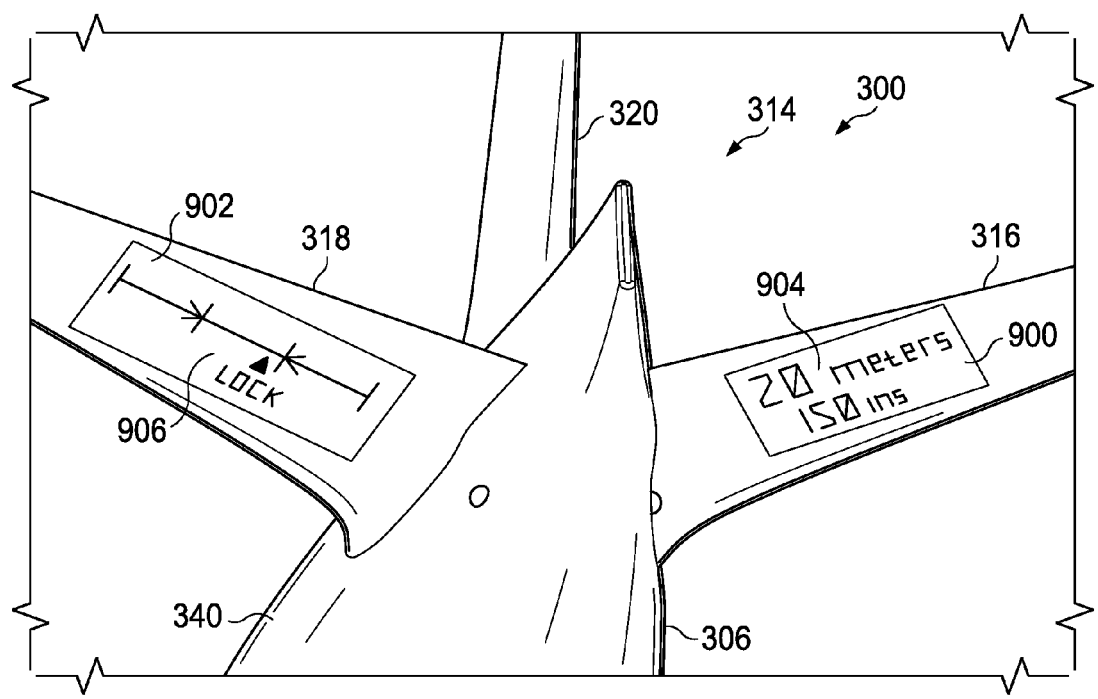
FIG. 9 is an illustration of a first display unit on a first horizontal stabilizer and a second display unit on a second horizontal stabilizer of the aircraft in FIG. 3 in accordance with an illustrative embodiment.

Turning now to FIG. 9, an illustration of a first display unit 900 on the first horizontal stabilizer 316 and a second display unit 902 on the second horizontal stabilizer 318 of the aircraft in FIG. 3 is depicted in accordance with an illustrative embodiment. As depicted, the first display unit 900 and the second display unit 902 are located on the bottom side of the first horizontal stabilizer 316 and the second horizontal stabilizer 318, respectively.

As depicted, the display of the first image 904 displayed on the first display unit 900 and the second image 906 displayed on the second display unit 902 may provide information for maintenance personnel. For example, the first image 904 and the second image 906 may be indicators for use in precise alignment and guidance of the aircraft 300 during a refueling operation of the aircraft 300.

The illustrative examples in FIGS. 6-9 depict images being displayed on the exterior surface 340 of the aircraft 300 during different phases of operation of the aircraft 300. These phases may include, for example, without limitation, takeoff, level flight, landing, taxiing, refueling, operations while in a stationary position, and other suitable phases of operation of the aircraft 300.

Figure 10:
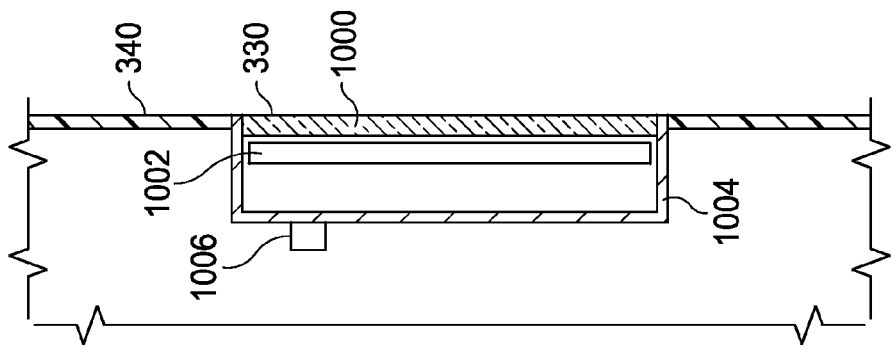
FIG. 10 is an illustration of a cross-sectional view of a vertical stabilizer of the aircraft in FIG. 3 in accordance with an illustrative embodiment.

With reference now to FIG. 10, an illustration of a cross-sectional view of the vertical stabilizer 320 of the aircraft 300 taken along the lines 10-10 in FIG. 3 is depicted in accordance with an illustrative embodiment. As depicted, the display unit 330 is substantially flush to the exterior surface 340 of the aircraft 300 on the vertical stabilizer 320.

In this illustrative example, the display unit 330 includes a substantially transparent protective layer 1000, a display panel 1002, a support structure 1004, and a power connector 1006. The substantially transparent protective layer 1000 is configured to protect the display panel 1002 from the environment that may be encountered by the exterior surface 340 of the aircraft 300. The power connector 1006 is configured to provide connection to a power source on the aircraft 300 in FIG. 3. The power connector 1006 may include data and radio frequency identifiers.

Figure 11:
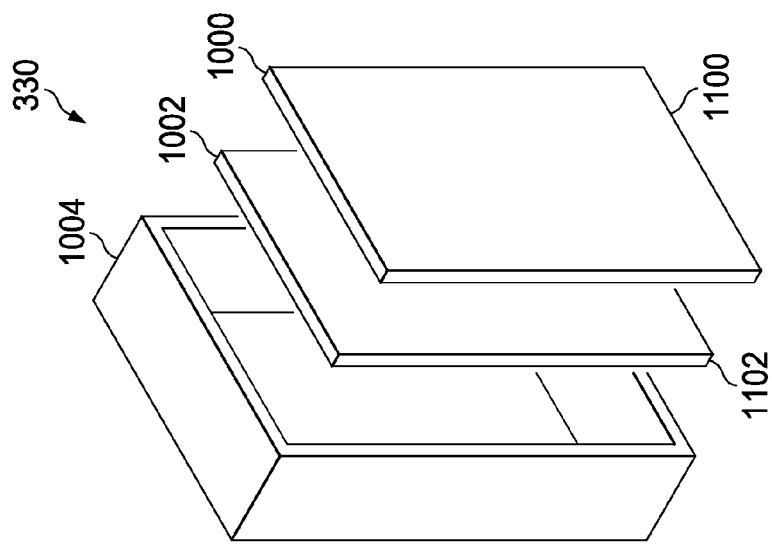
FIG. 11 is an exploded perspective view of the display unit on the vertical stabilizer of the aircraft in FIG. 3 in accordance with an illustrative embodiment.

Turning now to FIG. 11, an exploded perspective view of the display unit 330 on the vertical stabilizer 320 on the aircraft 300 in FIG. 3 is depicted in accordance with an illustrative embodiment. In this depicted example, the substantially transparent protective layer 1000 may take the form of a protective lens 1100. The protective lens 1100 may be one example of an implementation for substantially transparent protective layer 204 shown in block form in FIG. 2. In these illustrative examples, protective lens 1100 may be comprised of glass, a polycarbonate, or some other suitable type of material.

As depicted, the display panel 1002 may take the form of an organic light-emitting diode display 1102. By using the organic light-emitting diode display 1102, the display panel 1002 may be fabricated using various materials that may be lighter than with other types of displays. For example, the organic light-emitting diode display 1102 may be fabricated on a plastic or metal substrate and may be flexible. The support structure 1004 may be comprised of a composite material, a metal, aluminum, titanium, or some other suitable material depending on the particular implementation. The support structure 1004 may be integrated as a contiguous or semi-contiguous load bearing part of the aircraft structure.

Figure 12:
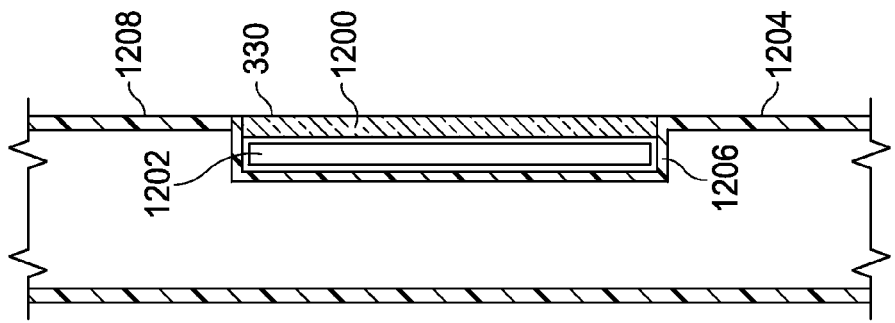
FIG. 12 is an illustration of another implementation for the display unit on the vertical stabilizer of the aircraft in FIG. 3 in accordance with an illustrative embodiment.

With reference now to FIG. 12, an illustration of another implementation for the display unit 330 on the vertical stabilizer 320 on the aircraft 300 in FIG. 3 is depicted in accordance with an illustrative embodiment. In this illustrative example, the display unit 330 may be comprised of a substantially transparent protective layer 1200 and a display panel 1202.

In this illustrative example, a support structure 1204 takes the form of the vertical stabilizer 320. As depicted, a recess 1206 may be formed in the vertical stabilizer 320 and the substantially transparent protective layer 1200. The display panel 1202 may be placed into the recess 1206.

As can be seen, the substantially transparent protective layer 1200 is substantially flush to a surface 1208 of the vertical stabilizer 320. In this manner, the display unit 330 forms part of the exterior surface 340 on the aircraft 300 with a desired level of aerodynamic performance.

The illustrations of the different locations for the display units 322, 324, 326, 328, 330, and 332 on the aircraft 300 in FIGS. 3-12 are only meant as some examples of the locations in which components in the display units 322, 324, 326, 328, 330, and 332 on the aircraft 300 in FIG. 3 may be placed on the aircraft 300. Further, the physical implementations for components in the display unit 200 illustrated in FIG. 2 in FIGS. 10-12 are also only examples of some implementations of the components for the display unit 200 in FIG. 2.

In still other illustrative examples, the recess 1206 may be unnecessary. Instead, the display unit 330 may be sufficiently thin when connected to the surface 1208 such that the recess 1206 is not needed to obtain desired aerodynamic performance.

For example, the display unit 330 may be manufactured as part of an appliqué that is placed on the surface 1208. For example, the support structure 1204 may be the substrate or layer of material for the appliqué. The display panel 1202 may be an organic light-emitting diode display formed on the layer of material. In this manner, the display unit 330 may be more easily added to existing aircraft as an aftermarket upgrade, option, or refurbishment. In other illustrative examples, the appliqué may be attached to an aircraft structure of dimension and shape such that desired aerodynamic performance is achieved.

Figure 13:
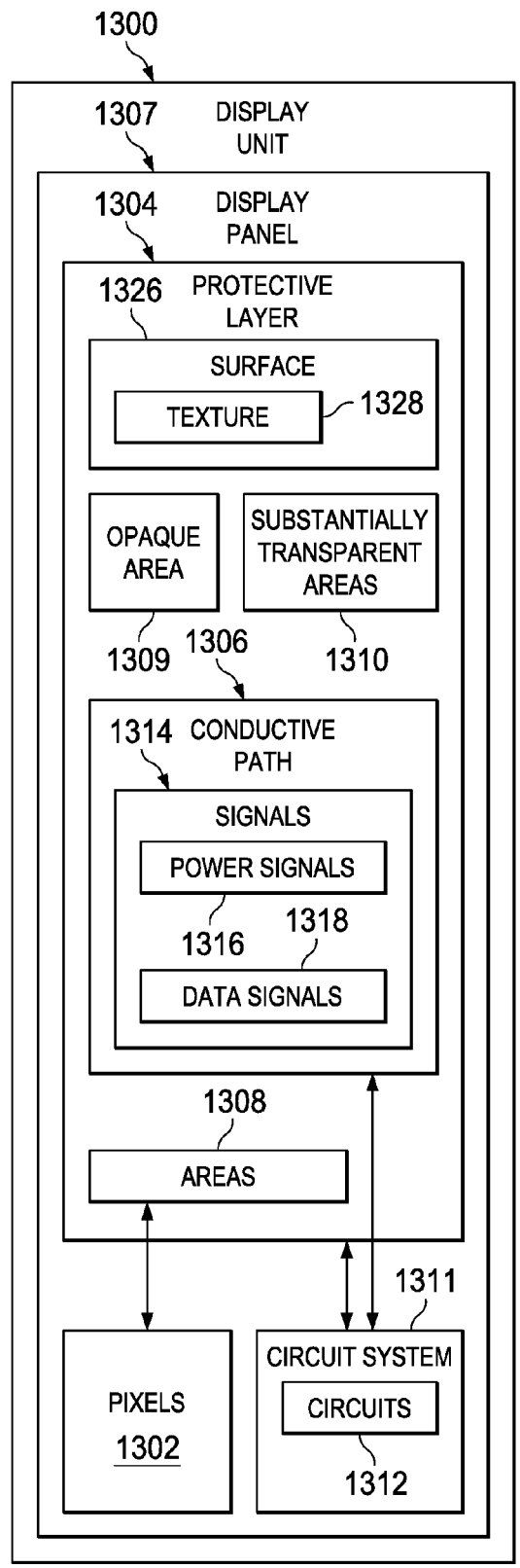
FIG. 13 is an illustration of a block diagram of a display unit in accordance with an illustrative embodiment.

With reference next to FIG. 13, an illustration of a block diagram of a display unit is depicted in accordance with an illustrative embodiment. Display unit 1300 illustrated in this figure is an example of a display unit that may be used in the number of display units 116 in the display system 106 for the aircraft 104 in FIG. 1.

As depicted in this particular example, display unit 1300 may be placed in different locations in aircraft 104. For example, display unit 1300 may be located in a location selected from an exterior of the aircraft, an interior of the aircraft, a fuselage, a wing, a winglet, a horizontal stabilizer, a vertical stabilizer, an engine housing, a passenger cabin, a cockpit, a galley, or some other suitable location. Display unit 1300 may display various types of information selected from at least one of a logo, a trademark, an advertisement, a tail number, safety information, flight information, baggage claim information, ground crew information, gate information, a direction blinker, a navigation light, warning information, or some other suitable type of information.

In this illustrative example, the display unit 1300 includes a number of different components. As depicted, display unit 1300 includes pixels 1302, protective layer 1304, and conductive path 1306. In this depicted example, these different components form display panel 1307 for display unit 1300. Display unit 1300 may include one or more panels in addition to display panel 1307.

In this illustrative example, a pixel in pixels 1302 is a smallest element that may be controlled to perform at least one of emitting or receiving a signal. In particular, a pixel may be a smallest address book element that may be controlled to perform at least one of emitting or receiving a signal. For example, pixels 1302 are comprised of at least one of a light emitting element, a light-emitting diode, an organic light-emitting diode, a plasma cell, a quantum dot, a liquid crystal cell, a radio frequency transmitter, an infrared transmitter, an ultraviolet light transmitter, or some other suitable device or system that may be used as a pixel.

As depicted, protective layer 1304 is associated with pixels 1302. When one component is "associated" with another component, the association is a physical association in the depicted examples. For example, a first component, pixels 1302, may be considered to be physically associated with a second component, protective layer 1304, by at least one of being secured to the second component, bonded to the second component, mounted to the second component, welded to the second component, fastened to the second component, or connected to the second component in some other suitable manner. The first component also may be connected to the second component using a third component. The first component may also be considered to be physically associated with the second component by being formed as part of the second component, extension of the second component, or both.

In some illustrative examples, pixels 1302 may be associated with protective layer 1304 by being embedded within protective layer 1304. In particular, pixels 1302 may be located inside protective layer 1304 such that pixels 1302 are not exposed to the environment around protective layer 1304. For example, pixels 1302 may be encapsulated or immersed within protective layer 1304. In other illustrative examples, openings may be present in protective layer 1304 in areas 1308 where pixels 1302 are located in protective layer 1304.

In this illustrative example, protective layer 1304 is substantially transparent in areas 1308 over pixels 1302. In this illustrative example, protective layer 1304 may be at least one of opaque or substantially transparent in another area other than areas 1308 of pixels 1302.

In this manner, protective layer 1304 may have opaque area 1309 in addition to substantially transparent areas 1310. In particular, pixels 1302 are located in substantially transparent areas 1310 when opaque area 1309 is present.

In these illustrative examples, opaque area 1309 may be used to provide at least one of aesthetics or information for an aircraft 104 in FIG. 1. For example, opaque area 1309 may include at least one of an image, a color, text, an applique, or some other suitable visualization that provides at least one of aesthetics or information.

Further, protective layer 1304 may be selected from at least one of a flexible layer and a rigid layer. Further, depending on the configuration of display unit 1300, protective layer 1304 may be directly connected, bonded, glued, or otherwise connected to a portion of aircraft 104 in FIG. 1. The support structure may be the fuselage, cabin wall, or other existing structure in aircraft 104.

In this illustrative example, conductive path 1306 in protective layer 1304 performs at least one of cooling or heating for the different components in display unit 1300. In particular, conductive path 1306 may perform heating, cooling, or both for pixels 1302. In this illustrative example, pixels 1302 are located on conductive path 1306. Pixels 1302 are connected to conductive path 1306. In this illustrative example, the connection may be a thermal connection. The thermal connection allows pixels 1302 to transfer heat with conductive path 1306. In particular, heat may be transferred to or from pixels 1302 using conductive path 1306.

Further, in this illustrative example, display unit 1300 also may include circuit system 1311. Circuit system 1311 may be used to control the operation of pixels 1302 or to perform other functions in the illustrative example. As depicted, circuit system 1311 includes a number of circuits 1312. As depicted, the number of circuits 1312 may be encapsulated within protective layer 1304 or otherwise associated with protective layer 1304 based on the particular implementation. In this illustrative example, number of circuits 1312 may be selected from at least one of circuits, integrated circuit chips, a radio frequency emitter, a light meter, a thermometer, a memory, a processor unit, a video controller, a conductive path, a trace, or some other suitable type of circuit.

The number of circuits 1312 are associated with protective layer 1304 and connected to conductive path 1306. In this illustrative example, the connection may be a thermal connection that allows for a transfer of heat between the number of circuits 1312 and conductive path 1306. In this manner, conductive path 1306 also may perform at least one of heating or cooling for the number of circuits 1312 in circuit system 1311.

Additionally, conductive path 1306 also may conduct signals 1314. With this use of conductive path 1306, the connection of the number of circuits 1312 to conductive path 1306 also may be a connection that allows for a transfer of signals 1314 between the number of circuits 1312 and conductive path 1306. Further, pixels 1302 also may be connected to conductive path 1306. The connection may be, for example, at least one of an electrical connection, an optical connection, or some other suitable connection.

With the electrical connections, signals 1314 may be used by at least one of pixels 1302 or circuit system 1311 that are connected to conductive path 1306. In the illustrative example, signals 1314 are selected from at least one of power signals 1316 or data signals 1318. Signals 1314 may be selected from at least one of electrical signals, optical signals or other suitable types of signals that may be received and used by at least one of pixels 1302 and circuit system 1311 in these illustrative examples.

In some illustrative examples, data signals 1318 may be sent from at least one of pixels 1302 or a number of circuits 1312 in circuit system 1311 to a computer or other device located outside of display unit 1300. In this manner, conductive path 1306 may provide a bidirectional transfer of data signals 1318. A circuit within circuits 1312 and a pixel in pixels 1302 may send signals, receive signals, or both send and receive signals with respect to each other and other ones of circuits 1312 and ones of pixels 1302.

Additionally, protective layer 1304 has surface 1326 that may have texture 1328. In this illustrative example, texture 1328 may cause a desired airflow over the protective layer. This desired airflow may provide a desirable performance such as fuel efficiency or drag for aircraft 104 in FIG. 1. This surface may be formed as part of protective layer 1304 or may be another layer placed on protective layer 1304.

The illustration of a display unit 1300 in FIG. 13 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, pixels 1302 perform at least one of receiving signals or transmitting signals. In particular, when receiving signals, pixels 1302 may receive information or act as a sensor. This information received by pixels 1302 may be sent over conductive path 1306 as signals 1314 for use by computers or other components in aircraft 104 in FIG. 1. Further, pixels 1302 may also transmit signals other than light used to convey information to a human viewer of display unit 1300. In another illustrative example, a viewer may be a device such as, for example, a video camera or a detector. For example, pixels 1302 may also transmit radio frequency signals in addition to or in place of light signals. In particular, pixels 1302 may function as an antenna in some illustrative examples.

In yet another example, a pixel in pixels 1302 may include circuits as part of a pixel other than circuits that emit light signals. For example, a pixel also may include at least one of a memory, a processor unit, a radio frequency receiver, a battery, a radio frequency emitter, a light meter, a computer clock, a thermometer, or some other suitable circuit or device in addition to a light emitting diode that emits visible light. These components in a pixel may reduce the amount of other circuits that may be needed in circuit system 1311. For example, the memory may store an internet protocol address for the pixel or for a destination node. The processor may perform operations, including sending and receiving information.

Figure 14:
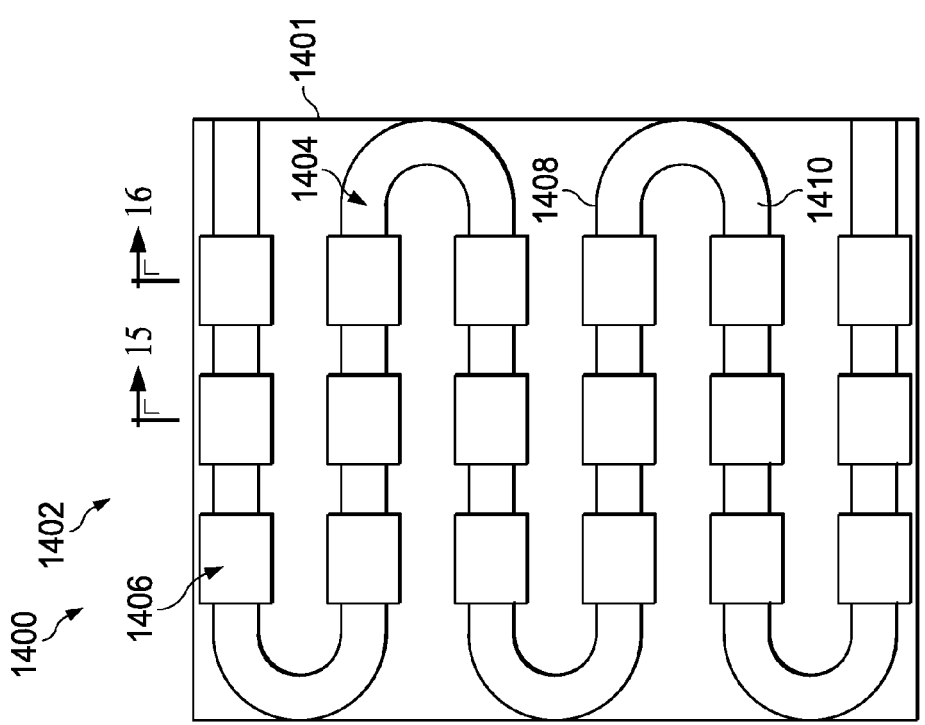
FIG. 14 is an illustration of a display unit with a cooling system in accordance with an illustrative embodiment.

With reference now to FIG. 14, an illustration of a display unit with a cooling system is depicted in accordance with an illustrative embodiment. As depicted, a display unit 1400 is an example of a display unit in display units 116 shown in block form in FIG. 1. More specifically, a display panel 1401 is one example of the display panel 202 in the display unit 200 in FIG. 2. The display unit 1400 may be configured to have one display panel or have multiple display panels on each side of the display unit 1400 in these illustrative examples. Display unit 1400 also may be an example of a physical implementation for display unit 1300 shown in block form in FIG. 13.

As depicted, the display panel 1401 includes an organic light-emitting diode display 1402 and a cooling system 1404. The organic light-emitting diode display 1402 includes a number of light-emitting diodes 1406. The number of light-emitting diodes 1406 may be oriented in a non-normal manner. In other words, the spacing and/or orientation of the number of light-emitting diodes 1406 along the plane of the display unit 1400 may be non-normal in these illustrative examples.

For example, the spacing of the light-emitting diodes in the number of light-emitting diodes 1406 may be random, where a first pair of light-emitting diodes is spaced differently than a second pair of light-emitting diodes. The first pair of light-emitting diodes may be closer together than the second pair of light-emitting diodes. Further, the orientation of the first pair of light-emitting diodes may be different than the orientation of the second pair of light-emitting diodes in relation to the surface of the display unit 1400.

The cooling system 1404 may be configured to cool the number of light-emitting diodes 1406. For example, the cooling system 1404 may transfer heat away from the number of light-emitting diodes 1406 during operation of the display panel 1401 to prevent undesired operation of the number of light-emitting diodes 1406 due to overheating. In other illustrative examples, the cooling system 1404 may transfer heat to the number of light-emitting diodes 1406 during operation of the display panel 1401 to prevent undesired operation of the number of light-emitting diodes 1406 due to hypothermia.

The cooling system 1404 may be one implementation for the heat transfer system 134 in FIG. 1 and the heat conductor 214 in FIG. 2. In these illustrative examples, the cooling system 1404 may include a cooling path 1408.

The cooling path 1408 may be configured to direct the flow of a cooling fluid 1410 in these illustrative examples. The cooling fluid 1410 may be, for example, without limitation, at least one of air, nitrogen, a gas, a nanofluid, jet fuel, a liquid, water, ethylene glycol, and other suitable types of cooling fluids. In other illustrative examples, an electronic cooling device may be located within the cooling path 1408 or may replace the cooling path 1408. This cooling device may be a peltier device in these illustrative examples.

As depicted, cooling path 1408 may be comprised of different types of components. For example, cooling path 1408 may be a tube or channel configured to carry a flow of a cooling fluid. In other examples, cooling path 1408 may be a channel in which a cooling material or a cooling device may be located. For example, the cooling path 1408 may be comprised of at least one of aluminum, copper, stainless steel, and some other suitable type of material. In another illustrative example, the cooling path 1408 may also serve as an electrical conductor, ground path, or both for the number of light-emitting diodes 1406.

While the illustrative embodiments show the number of light-emitting diodes 1406 with 18 light-emitting diodes, other numbers of light-emitting diodes may be present in the organic light-emitting diode display 1402. For example, 10 light-emitting diodes, 55, light-emitting diodes, 2000 light-emitting diodes, or some other number of light-emitting diodes may be present in the organic light-emitting diode display 1402 depending on the particular implementation. Further, the number of light-emitting diodes 1406 in these illustrative examples may be representative of other types of light-emitting elements such as a plasma element, a liquid crystal display element, or other suitable types of light-emitting elements. The illustrative examples are shown for purposes of illustration and description.

Figure 15:
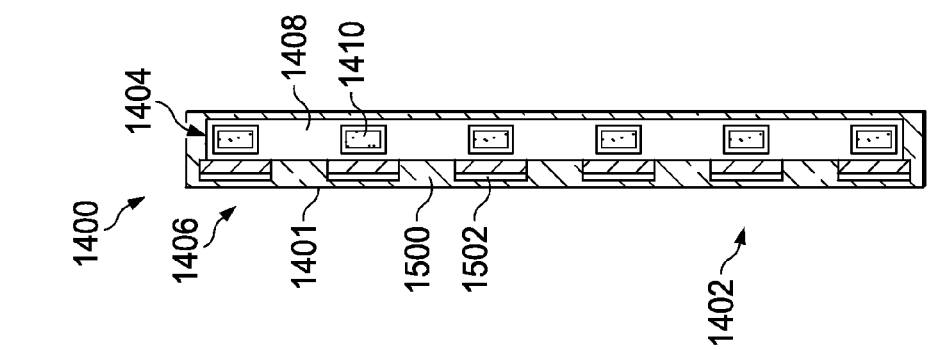
FIG. 15 is an illustration of a cross-sectional view of a display unit with a cooling system in accordance with an illustrative embodiment.

Turning now to FIG. 15, an illustration of a cross-sectional view of a display unit with a cooling system is depicted in accordance with an illustrative embodiment. As depicted, a display unit 1400 is an example of a display unit in display units 116 shown in block form in FIG. 1. More specifically, the display unit 1400 is seen taken along the lines 15-15 in FIG. 14.

In this view, the number of light-emitting diodes 1406 in the organic light-emitting diode display 1402 in the display panel 1401 are shown with protective layer 1500. The protective layer 1500 may be one example of substantially transparent protective layer 204 shown in block form in FIG. 2.

Further, the number of light-emitting diodes 1406 may have gap 1502. Gap 1502 may be a vacuum or may hold a gas, such as an inert gas. In this illustrative example, gap 1502 is configured to provide insulation between the number of light-emitting diodes 1406 and the external environment surrounding the aircraft 104. In some illustrative examples, gap 1502 may be omitted depending on the particular implementation.

In this example, the cooling system 1404 is shown such that the cooling path 1408 is positioned relative to the rows of the number of light-emitting diodes 1406. The cooling fluid 1410 flows through the cooling path 1408 to regulate the temperature of the number of light-emitting diodes 1406. Of course, the cooling path 1408 may have different configurations other than the configuration shown in this figure depending on the particular implementation.

Figure 16:
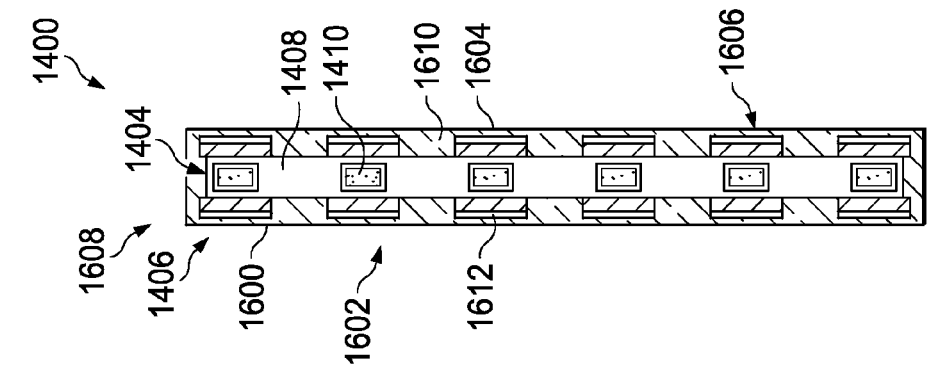
FIG. 16 is an illustration of another cross-sectional view of a display unit with a cooling system in accordance with an illustrative embodiment.

With reference now to FIG. 16, an illustration of another cross-sectional view of a display unit with a cooling system is depicted in accordance with an illustrative embodiment. As depicted, the display unit 1400 is an example of a display unit in the display units 116 shown in block form in FIG. 1. More specifically, the display unit 1400 is seen taken along the lines 16-16 in FIG. 14. The display unit 1400 is comprised of two display panels instead of a single display panel in this illustrative example.

As depicted, the display unit 1400 may have a first side 1600 with a first display panel 1602 and a second side 1604 with a second display panel 1606. A number of light-emitting diodes 1406 is located on the first side 1600 and the second side 1604 of the display unit 1400.

A protective layer 1610 may be configured to protect each of the number of light-emitting diodes 1406. The protective layer 1610 may be one implementation for the substantially transparent protective layer 204 shown in block form in FIG. 2. Further, the number of light-emitting diodes 1406 may have gaps 1612.

The cooling system 1404 with the cooling path 1408 and the cooling fluid 1410 is shown in this illustrative example. As depicted, the cooling system 1404 may control the temperature of the number of light-emitting diodes 1406 on both first side 1600 and second side 1604 of the display unit 1400.

In the illustrative examples, the number of light-emitting diodes 1406 in FIG. 14 may output distinct wavelengths of light and may comprise of a cluster of elements, each representing different colors. These colors include, for example, red, green, blue, magenta, cyan, yellow, and white.

Figure 17:
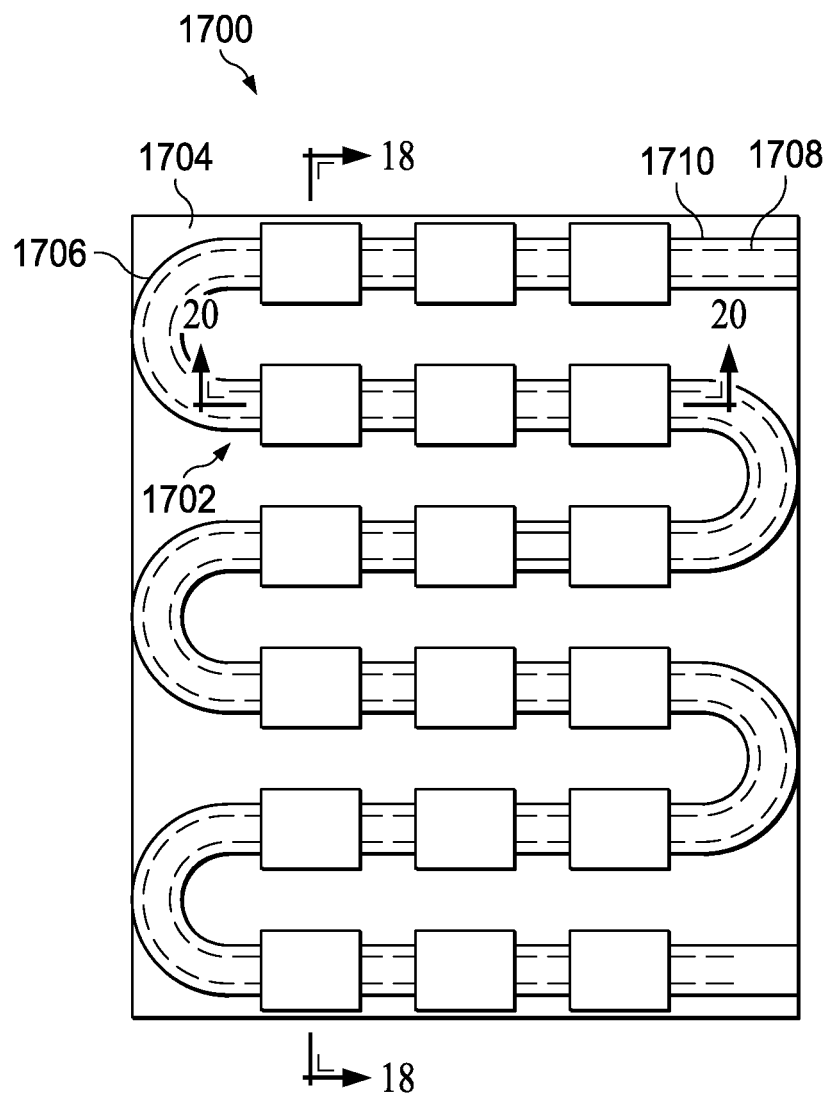
FIG. 17 is an illustration of a display unit in accordance with an illustrative embodiment.

With reference now to FIG. 17, an illustration of a display unit is depicted in accordance with an illustrative embodiment. As depicted, display unit 1700 is an example of a physical implementation of a display unit in display units 116 shown in block form in FIG. 1. Further, display unit 1700 is an example of a physical implementation of display unit 1300 shown in block form in FIG. 13. Display unit 1700 may be used on the exterior or interior of aircraft 104 in FIG. 1.

In this illustrative example, pixels 1702 are associated with protective layer 1704. Conductive path 1706 is present and pixels 1702 are located on and connected to conductive path 1706 in the illustrative example. As depicted, conductive path 1706 is also associated with protective layer 1704.

As depicted, conductive path 1706 is configured to provide at least one of cooling or heating of pixels 1702. Conductive path 1706 includes channel 1708. In this illustrative example, a cooling or heating fluid may flow through channel 1708 to provide a heating or cooling function. In one illustrative example, channel 1708 may be omitted from conductive path 1706.

Additionally, conductive path 1706 also includes trace 1710. As depicted, trace 1710 may conduct signals, such as electrical signals. Pixels 1702 are electrically connected to trace 1710 in this illustrative example.

Turning next to FIG. 18, an illustration of a cross-sectional view of a display system is depicted in accordance with an illustrative embodiment. In this figure, the cross-sectional view of display unit 1700 is an example of a cross-section of display unit 1700 taken along lines 18-18 in FIG. 17.

As depicted, pixels 1702 are encapsulated within protective layer 1704. In this illustrative example, protective layer 1704 provides a structure for supporting or holding pixels 1702. For example, protective layer 1704 may function as a support structure such as support structure 208 for display unit 200 in FIG. 2.

In this illustrative example, protective layer 1704 encapsulates pixels 1702. As seen in this illustrative example, protective layer 1704 does not cover all of trace 1710. Trace 1710 may include one or more circuits. In particular, protective layer 1704 does not need to cover or encapsulate all of trace 1710.

As depicted, cavities are located adjacent to pixels 1702. In particular, cavity 1806, cavity 1808, cavity 1810, cavity 1812, cavity 1814, and cavity 1816 are present adjacent to pixel 1818, pixel 1820, pixel 1822, pixel 1824, pixel 1826, and pixel 1828 in pixels 1702, respectively. These cavities may contain air, gas, or may be a vacuum depending on the particular implementation.

Turning next to FIG. 19, an illustration of another cross-sectional view of a display unit with a cooling system is depicted in accordance with an illustrative embodiment. In this figure, the cross-sectional view of display unit 1700 is an example of another implementation for the cross-section of display unit 1700 taken along lines 18-18 in FIG. 17.

As depicted, pixels 1702 are encapsulated within protective layer 1704. In this illustrative example, protective layer 1704 encapsulates pixels 1702. As seen in this example, protective layer 1704 also encapsulates all of trace 1710.

Also shown in this illustrative example are cavities adjacent to pixels 1702. In particular, cavity 1906, cavity 1908, cavity 1910, cavity 1912, cavity 1914, and cavity 1916 are present adjacent to pixel 1919, pixel 1920, pixel 1922, pixel 1924, pixel 1926, and pixel 1928 in pixels 1702, respectively.

Turning next to FIG. 20, an illustration of another cross-sectional view of a display unit with a cooling system is depicted in accordance with an illustrative embodiment. In this figure, the cross-sectional view of display unit 1700 is an example of a cross-section of display unit 1700 taken along lines 20-20 in FIG. 17.

In this illustrative example, pixel 2000, pixel 2002 and pixel 2004 in pixels 1702 are located on first side 2006 of conductive path 1706 in protective layer 1704. As depicted, chip 2008 and chip 2010 are located on second side 2012 of conductive path 1706.

The placement of these chips on the opposite side of conductive path 1706 from pixels 1702 allows for reducing the space between pixels as opposed to placing the devices on conductive path 1706 on the same side as pixels 1702. In this manner, the pixel density of display unit 1700 may be increased as compared to placing the chips on the same side of conductive path 1706.

Turning next to FIG. 21, an illustration of another cross-sectional view of a display unit with a cooling system is depicted in accordance with an illustrative embodiment. In this figure, the cross-sectional view is an example of another implementation for the cross-section of display unit 1700 in FIG. 20.

In this illustrative example, pixel 2100, pixel 2102, and pixel 2104 in pixels 1702 are located on first side 2106 of conductive path 1706. Chip 2108 and chip 2110 are also located on first side 2106 of conductive path 1706. As depicted, chips or other devices are absent on second side 2114 of conductive path 1706.

In this illustrative example, second side 2114 of conductive path 1706 does not have pixels or chips or other devices. As a result, the thickness of display unit 1700 may be reduced as compared to the illustrative example shown in FIG. 20. However, the pixel density may not be as great as when using the implementation shown in FIG. 20.

Figure 22:
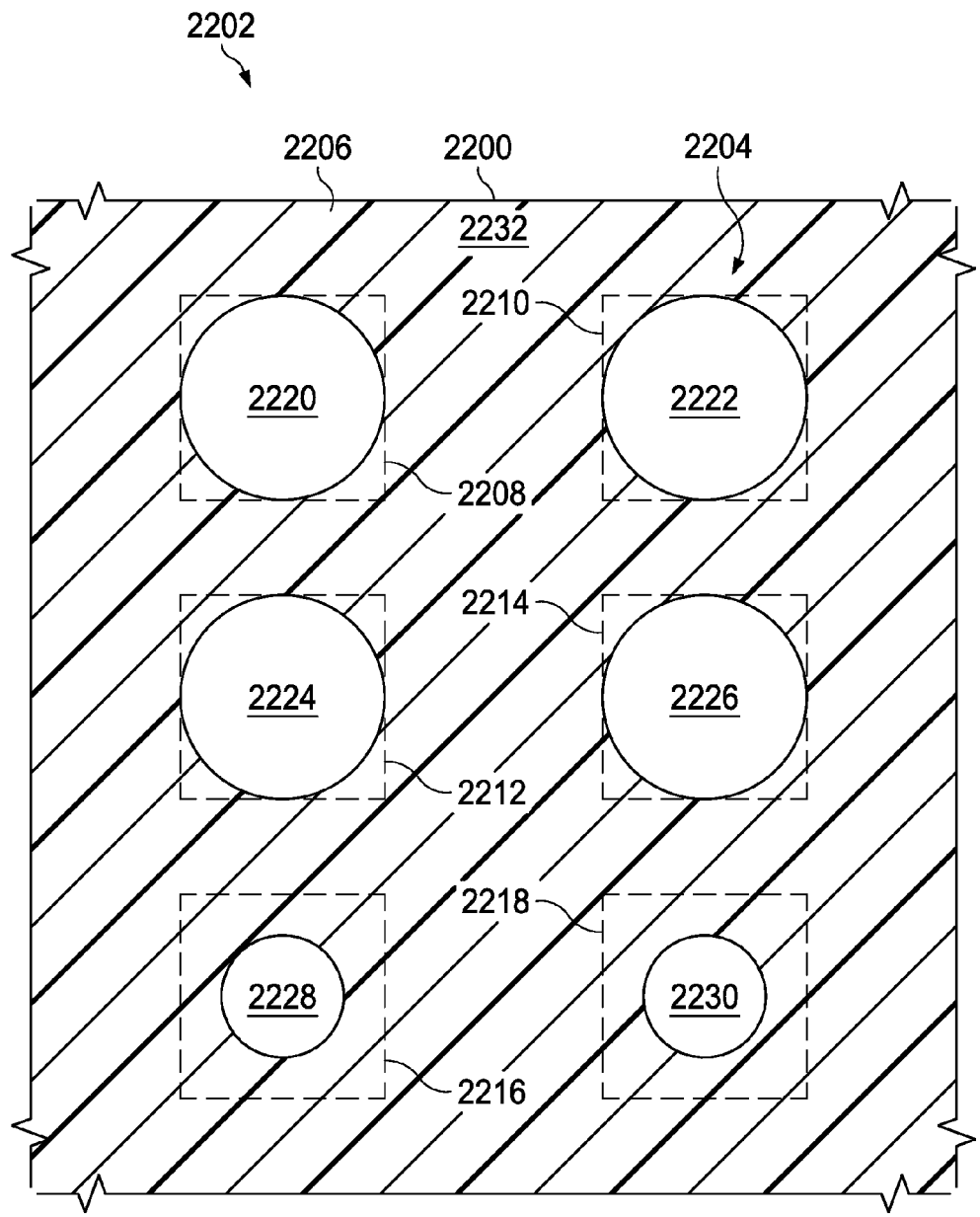
FIG. 22 is an illustration of a portion of a display unit in accordance with an illustrative embodiment.

Turning next to FIG. 22, an illustration of a portion of a display unit is depicted in accordance with an illustrative embodiment. As depicted, portion 2200 of display unit 2202 is an example of a physical implementation of a display unit in display units 116 shown in block form in FIG. 1. Portion 2200 of display unit 2202 also may be an example of a physical implementation of display unit 1300 shown in block form in FIG. 13.

In this illustrative example, pixels 2204 are associated with protective layer 2206. As depicted, pixels 2204 include pixel 2208, pixel 2210, pixel 2212, pixel 2214, pixel 2216, and pixel 2218. The pixels are shown in phantom because the pixels are located below protective layer 2206.

In this depicted example, protective layer 2206 is substantially transparent in areas where the pixels are located. For example, protective layer 2206 is substantially transparent in area 2220, area 2222, area 2224, area 2226, area 2228, and area 2230. In this illustrative example, these areas are substantially transparent such that the pixels may transmit or receive light. Another area other than the areas where the pixels are located is opaque to form opaque area 2232 in this illustrative example.

Opaque area 2232 may have images, color, text, applique, or other aesthetic or informational elements. For example, the color may be the color of a passenger cabin if the display is located in an interior of an aircraft. If the display is located on the exterior of the aircraft, the color may be the color of the exterior of the aircraft.

In another illustrative example, opaque area 2232 may have a logo or other design on the exterior or interior of the aircraft. In yet another illustrative example, opaque area 2232 may have multiple colors.

In this illustrative example, the areas that are substantially transparent are substantially the same size as depicted for some of the pixels, such as area 2220 for pixel 2208, area 2222 pixel 2210, area 2224 for pixel 2212, and area 2226 for pixel 2214. Further, the areas may be smaller than the pixel as shown in area 2228 for pixel 2216, and area 2230 for pixel 2218. In other words, only a portion of a pixel may be under the substantially transparent area in protective layer 2206 at the location of the pixel. The other portion of the pixel may be under the opaque area of protective layer 2206.

The illustration of areas of different sizes in FIG. 22 is shown for purposes of depicting features of an illustrative example. When implemented in an aircraft, the areas may be of the same size rather than different sizes depending on the particular implementation.

The illustrations of display units and cross-sections in FIGS. 14-22 are not meant to limit the manner in which other illustrative examples may be implemented. For example, other numbers of pixels may be present in the display unit. For example, a display unit may have hundreds of pixels, thousands of pixels, or some other number of pixels. Further, although a particular pattern is shown for the conductive paths, other patterns may be used. Also, the conductive path also may not always include traces for electrical connections in the different devices. Also, in other illustrative examples, the conductive path may conduct light signals rather than electrical signals for use by at least one of the pixels, chips, or other circuits that may be used in a display unit. As yet another example, textures may be used on the surface of the protective layers.

The different components illustrated in FIGS. 3-22 may be combined with components in FIG. 1, FIG. 2, and FIG. 13 used with the components in FIG. 1, FIG. 2, and FIG. 13, or a combination of the two. Additionally, some of the components in FIGS. 3-22 are illustrative examples of how components shown in block form in FIG. 1, FIG. 2, and FIG. 13 can be implemented as physical structures.

Further, the illustration of the aircraft 300 and the different display units on the aircraft 300 is only an example of one possible implementation for the aircraft 104 in FIG. 1 and some possible implementations for the display unit 200 in FIG. 2. These illustrations are not meant to imply limitations to the manner in which other physical implementations of the aircraft 104 in FIG. 1 and the display unit 200 in FIG. 2 may be implemented.

Figure 23:
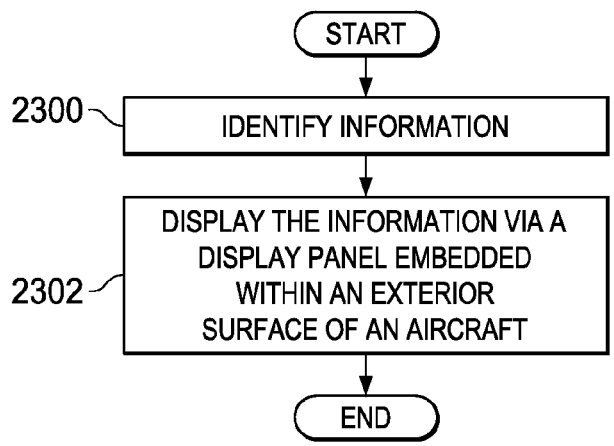
FIG. 23 is an illustration of a flowchart of a process for displaying the information on the exterior surface of the aircraft in FIG. 1 in accordance with an illustrative embodiment.

With reference now to FIG. 23, an illustration of a flowchart of a process for displaying the information 114 on the exterior surface 118 of the aircraft 104 in FIG. 1 is depicted in accordance with an illustrative embodiment. The process illustrated in this example may be implemented using the display unit 200 in FIG. 2.

The process begins by identifying the information 114 (operation 2300). The process then displays the information 114 via the display panel 202 embedded within the exterior surface 118 of the aircraft 104 (operation 2302) with the process terminating thereafter.

Figure 24:
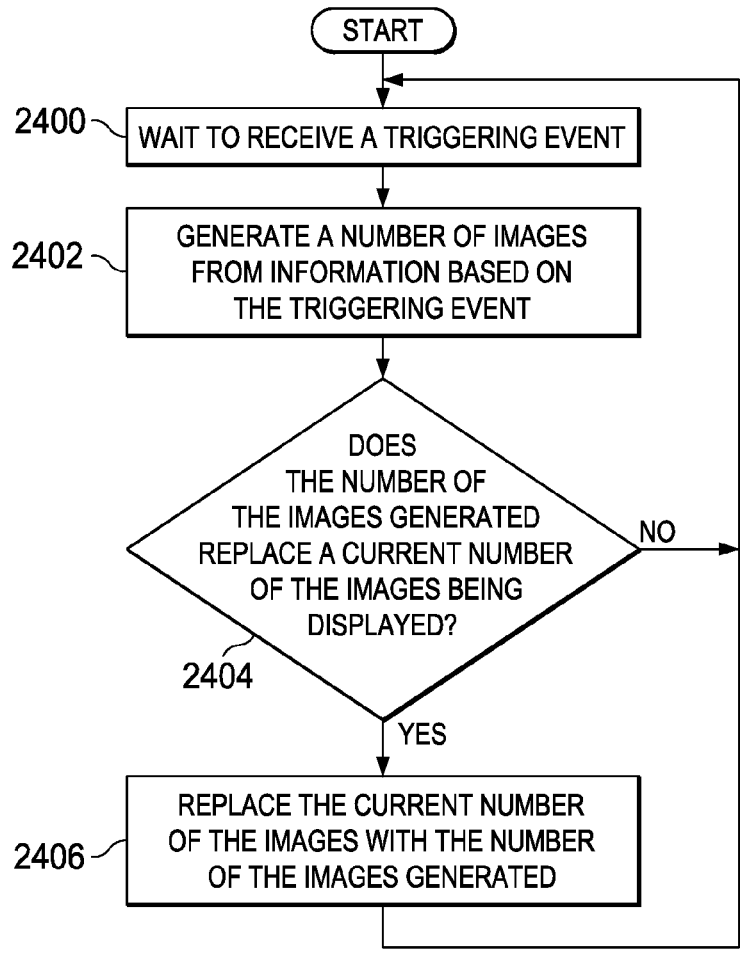
FIG. 24 is an illustration of a flowchart of a process for selecting the image in FIG. 2 using the information in FIG. 1 in accordance with an illustrative embodiment.

Turning now to FIG. 24, an illustration of a flowchart of a process for selecting the image 210 in FIG. 2 using the information 114 in FIG. 1 is depicted in accordance with an advantageous embodiment. The process illustrated in FIG. 24 may be implemented in the display module 112 in the computer system 108 in FIG. 1.

The process begins by waiting to receive a triggering event (operation 2400). The triggering event may be a triggering event in the triggering events 122 in FIG. 1. When a triggering event is received, the process generates a number of the images 120 using the information 114 based on the triggering events 122 (operation 2402). The identification of the number of the images 120 depends on the triggering event in these illustrative examples. The generation of the number of the images 120 may be performed by the display module 112. The number of the images 120 may be generated by creating new images, selecting pre-existing images in the information 114, or some combination thereof.

For example, the number of the images 120 generated may be based on a phase of flight for the aircraft 104. If the aircraft 104 is on the taxiway, the number of the images 120 may include a logo. If the aircraft 104 is at the gate and maintenance is being performed for the next flight, the number of the images 120 may include maintenance information. Also, the number of the images 120 also may be based on the location of the aircraft 104.

For example, the number of the images 120 may include a logo for a city at which the aircraft 104 is located. As yet another example, the number of the images 120 may be selected to include advertisements based on the city, time of year, weather, local sports affiliations, and other events that may be occurring, as identified by the triggering event that is received. The number of the images 120 may be an image that is to be displayed by each of the number of the display units 116, or the number of the images 120 may be a sequence of the images 120 for an animation or video, some combination thereof, or other suitable types of images.

Thereafter, a determination is made as to whether the number of the images 120 generated replaces a current number of the images 120 being displayed (operation 2404). If the number of the images 120 generated replaces the current number of the images 120, the current number of the images 120 is replaced with the number of the images 120 generated (operation 2406), with the process then returning to operation 2400 as described herein. The replacement of the number of the images 120 generated may be performed by the display module 112 sending the number of the images 120 to appropriate ones of the number of display units 116. With reference again to operation 2404, if the number of the images 120 generated is the same as the current number of the images 120, the process returns to operation 2400.

Figure 25:
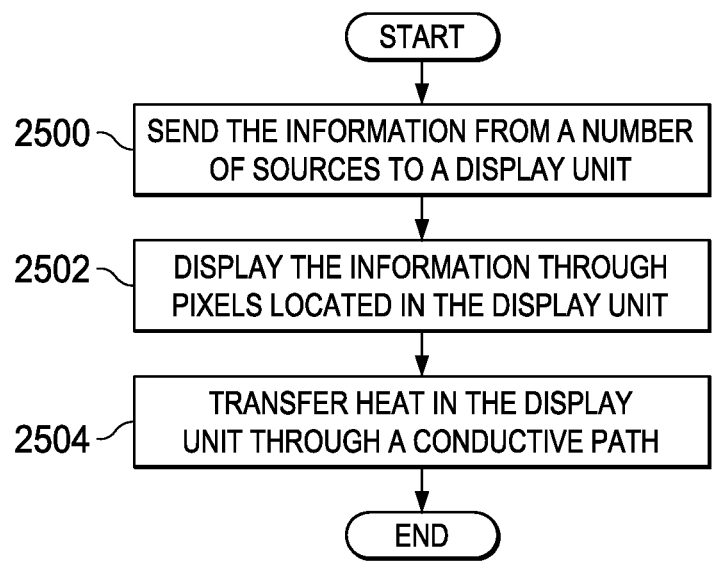
FIG. 25 is an illustration of a flowchart of a process for displaying information in accordance with an illustrative embodiment.

With reference now to FIG. 25, an illustration of a flowchart of a process for displaying information is depicted in accordance with an illustrative embodiment. The process illustrated in FIG. 25 may be implemented using display unit 200 in FIG. 2 or display unit 1300 in FIG. 13. The display units may be located in at least one of the exterior or interior of an aircraft.

The process begins by sending the information from a number of sources to a display unit (operation 2500). The sending of the information in the number of sources to the display unit may occur by sending data signals to the display unit. The data signals may be sent through a conductive path in the display unit. Further, power signals also may be sent through the conductive path to provide power to the display unit. For example, at least one of information or power may be sent to pixels, circuits, and other devices that may be present in the display unit.

The process displays the information through pixels located in the display unit (operation 2502). The process transfers heat in the display unit through a conductive path (operation 2504), with the process terminating thereafter. The transfer of heat includes at least one of cooling or heating the display unit. In this manner, the conductive path may provide both a transfer of heat and a transfer of signals with the display unit.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Turning now to FIG. 26, an illustration of a block diagram of a data processing system is depicted in accordance with an illustrative embodiment. A data processing system 2600 may be used to implement computer system 108, the display control system 110, the display module 112, and other suitable devices that may be present in the aircraft 104 in FIG. 1 or in the aircraft 300 in FIG. 3. In this illustrative example, the data processing system 2600 includes a communications framework 2602, which provides communications between a processor unit 2604, a memory 2606, a persistent storage 2608, a communications unit 2610, an input/output unit 2612, and a display 2614. In this example, communication framework may take the form of a bus system.

The processor unit 2604 serves to execute instructions for software that may be loaded into the memory 2606. The processor unit 2604 may be a number of processors, a multi-processor core, or some other type of processor, depending on the particular implementation.

The memory 2606 and the persistent storage 2608 are examples of storage devices 2616. A storage device is any piece of hardware that is capable of storing information, such as, for example, without limitation, data, program code in functional form, and/or other suitable information either on a temporary basis and/or a permanent basis. The storage devices 2616 may also be referred to as computer readable storage devices in these illustrative examples. The memory 2606, in these examples, may be, for example, a random access memory or any other suitable volatile or non-volatile storage device. The persistent storage 2608 may take various forms, depending on the particular implementation.

For example, the persistent storage 2608 may contain one or more components or devices. For example, the persistent storage 2608 may be a hard drive, a flash memory, a rewritable optical disk, a rewritable magnetic tape, or some combination of the above. The media used by the persistent storage 2608 also may be removable. For example, a removable hard or flash drive may be used for the persistent storage 2608.

The communications unit 2610, in these illustrative examples, provides for communications with other data processing systems or devices. In these illustrative examples, the communications unit 2610 is a network interface card.

The input/output unit 2612 allows for input and output of data with other devices that may be connected to the data processing system 2600. For example, the input/output unit 2612 may provide a connection for user input through a keyboard, a mouse, and/or some other suitable input device. Further, the input/output unit 2612 may send output to a printer or other systems. The display 2614 provides a mechanism to display information to a user.

Instructions for the operating system, applications, drivers, and/or programs may be located in the storage devices 2616, which are in communication with the processor unit 2604 through the communications framework 2602. The processes of the different embodiments may be performed by the processor unit 2604 using computer-implemented instructions, which may be located in a memory, such as the memory 2606 or using client instruction.

These instructions are referred to as program code, computer usable program code, or computer readable program code that may be read and executed by a processor in the processor unit 2604. The program code in the different embodiments may be embodied on different the physical or computer readable storage media, such as the memory 2606 or the persistent storage 2608.

A program code 2618 is located in a functional form on a computer readable media 2620 that is selectively removable and may be loaded onto or transferred to the data processing system 2600 for execution by the processor unit 2604. The program code 2618 and the computer readable media 2620 form a computer program product 2622 in these illustrative examples. In one example, the computer readable media 2620 may be a computer readable storage media 2624 or a computer readable signal media 2626. In these illustrative examples, the computer readable storage media 2624 is a physical or tangible storage device used to store the program code 2618 rather than a medium that propagates or transmits the program code 2618.

Alternatively, the program code 2618 may be transferred to the data processing system 2600 using the computer readable signal media 2626. The computer readable signal media 2626 may be, for example, a propagated data signal containing the program code 2618. For example, the computer readable signal media 2626 may be an electromagnetic signal, an optical signal, and/or any other suitable type of signal. These signals may be transmitted over communications links, such as wireless communications links, optical fiber cable, coaxial cable, a wire, and/or any other suitable type of communications link.

The different components illustrated for the data processing system 2600 are not meant to provide architectural limitations to the manner in which different embodiments may be implemented. The different illustrative embodiments may be implemented in a data processing system including components in addition to and/or in place of those illustrated for the data processing system 2600. Other components shown in FIG. 26 can be varied from the illustrative examples shown. The different embodiments may be implemented using any hardware device or system capable of running the program code 2618.

Illustrative embodiments of the disclosure may be described in the context of an aircraft manufacturing and service method 2700 as shown in FIG. 27 and an aircraft 2800 as shown in FIG. 28. Turning first to FIG. 27, an illustration of a block diagram of an aircraft manufacturing and service method is depicted in accordance with an illustrative embodiment. The components illustrated in FIG. 1 and FIG. 2 may be implemented during the aircraft manufacturing and service method 2700. During pre-production, the aircraft manufacturing and service method 2700 may include specification and design 2702 of the aircraft 2800 in FIG. 28 and a material procurement 2704.

During production, component and subassembly manufacturing 2706 and system integration 2708 of the aircraft 2800 in FIG. 28 takes place. Thereafter, the aircraft 2800 in FIG. 28 may go through certification and delivery 2710 in order to be placed in service 2712. While in service 2712 by a customer, the aircraft 2800 in FIG. 28 is scheduled for routine maintenance and service 2714, which may include modification, reconfiguration, refurbishment, and other maintenance or service. Upgrades may occur prior to certification and delivery 2710 in these illustrative examples.

Each of the processes of the aircraft manufacturing and service method 2700 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, an individual proprietor, and so on.

With reference now to FIG. 28, an illustration of a block diagram of an aircraft is depicted in which an illustrative embodiment may be implemented. The aircraft 2800 may be one example of the aircraft 104 in FIG. 1 and the aircraft 300 in FIG. 3.

In this example, the aircraft 2800 is produced by the aircraft manufacturing and service method 2700 in FIG. 27 and may include an airframe 2802 with a plurality of systems 2804 and an interior 2806. Examples of the systems 2804 include one or more of a propulsion system 2808, an electrical system 2810, a hydraulic system 2812, and an environmental system 2814. Any number of other systems may be included. Although an aerospace example is shown, different illustrative embodiments may be applied to other industries, such as the automotive industry or space industry.

Apparatuses and methods embodied herein may be employed during at least one of the stages of the aircraft manufacturing and service method 2700 in FIG. 27. For example, the display system 106 in FIG. 1 may be implemented in the aircraft 2800 in FIG. 28 during the specification and design 2702 of the aircraft 2800. Further, the display units 116 may be manufactured during the component and subassembly manufacturing 2706 of the aircraft 2800 in FIG. 28. For example, a number of the display units 116 may be manufactured as integral parts of the airframe 2802 of the aircraft 2800. In other illustrative examples, a number of the display units 116 may be attached to the airframe 2802.

As another example, the display system 106 in FIG. 1 may be added to the aircraft 2800 in FIG. 28 during maintenance and service 2714 of the aircraft 2800. The number of display units 116 in FIG. 1 may be added to the aircraft 2800 during routine maintenance, refurbishment, upgrades, or other operations performed on the aircraft 2800 during the maintenance and service 2714 of the aircraft 2800. The use of a number of the different illustrative embodiments may substantially expedite the assembly of and/or reduce the cost of aircraft 2800.

With one or more of the different illustrative embodiments, the information 114 may be displayed in the images 120 on the exterior surface 118 of the aircraft 104. One or more of the images 120 may be changed at different times to provide the information 114 that may be relevant or desired for a particular situation or location of the aircraft 104. In this manner, logos and other information may be changed for the aircraft 104, depending on the phase of flight, location, operator ownership, or other status of the aircraft 104. For example, a logo or advertisement may be in the number of the images 120.

Additionally, a display unit in the display units 116 in FIG. 1 may display any type of images in the images 120. For example, display unit 330 may display at least one of a logo, a warning, an advertisement, gate information, baggage information, a tail number, an identification number, a video, or some other suitable image at the same time or at different times. In other words, one of the display units 116 is not limited to one type of image in the images 120. Further, a display unit in the display units 116 may display any type of information 114 suitable for display at a desired location on the aircraft 104. In other illustrative examples, a display unit in the display units 116 may not display any or certain information at certain times during the operation of the aircraft 104.

Additionally, although the display panels and display units in FIG. 3-9 are shown as displaying images 120 on a single side of the display unit, images 120 may also be displayed on multiple sides of a display unit in the display units 116. These images 120 may be the same images 120 or different images 120 depending on the particular implementation.

Further, safety and maintenance information also may be present in the information 114 that is displayed in the images 120. As an example, a warning of an engine start may be present in the images 120, a hazard location, a hazard description, and other information may be displayed in the images 120 on the exterior surface 118 of the aircraft 104 in various locations. As another example, the images 120 also may be used as navigation lights for the aircraft 104.

Further, the use of the display system 106 on the aircraft 104 may provide additional revenue streams for an airline or other operator of the aircraft 104 in FIG. 1. For example, billboard logos displayed on the display units 116 may replace painted or decal effects desired by leasing companies wishing to allocate advertising and logo space on the aircraft 104 in FIG. 1 to multiple airline or individual clients. In other illustrative examples, the use of the display system 106 on the aircraft 104 may reduce repainting or re-surfacing expenses when changing and/or modifying decals, images, or other advertisements.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   pixels;
   a protective layer associated with the pixels, wherein the protective layer is substantially transparent in areas over the pixels; and wherein the protective layer has a surface having a texture that causes a desired airflow over the protective layer; and
   a conductive path in the protective layer that transfers heat, wherein the pixels, the protective layer, and the conductive path form a display unit for an aircraft.

2. The apparatus of claim 1, wherein the conductive path conducts signals selected from at least one of power signals or data signals.

3. The apparatus of claim 2 further comprising:
   a number of circuits associated with the protective layer and connected to the conductive path.

4. The apparatus of claim 3, wherein the conductive path provides the signals to at least one of the pixels or the number of circuits.

5. The apparatus of claim 1, wherein the protective layer is selected from one of a flexible layer and a rigid layer.

6. The apparatus of claim 3, wherein at least one of the number of circuits and the pixels are encapsulated within the protective layer.

7. The apparatus of claim 1, wherein the protective layer has an opaque area in addition to the areas over the pixels that are substantially transparent.

8. The apparatus of claim 7, wherein the opaque area includes at least one of an image, a color, text, or an applique.

9. The apparatus of claim 1, wherein the pixels perform at least one of receiving signals and transmitting the signals.

10. The apparatus of claim 1, wherein the display unit is located in a location selected from an exterior of the aircraft, an interior of the aircraft, a fuselage, a wing, a winglet, a horizontal stabilizer, a vertical stabilizer, an engine housing, a passenger cabin, a cockpit, and a galley.

11. The apparatus of claim 1, wherein the pixels are comprised of at least one of a light emitting element, a light-emitting diode, an organic light-emitting diode, a plasma cell, a quantum dot, a liquid crystal cell, a radio frequency transmitter, an infrared transmitter, or an ultraviolet light transmitter.

12. The apparatus of claim 3, wherein the number of circuits is selected from at least one of circuits, integrated circuit chips, a radio frequency emitter, a light meter, a thermometer, a memory, a processor unit, or a video controller.

13. The apparatus of claim 1, wherein the display unit in operation receives information from at least one of a navigation source, an advertisement database, or a media library.

14. The apparatus of claim 13, wherein the information is selected from at least one of a logo, a trademark, an advertisement, a tail number, safety information, flight information, baggage claim information, ground crew information, gate information, a direction blinker, a navigation light, or warning information, and wherein the information is selected based on a phase of flight of the aircraft.

15. A method for displaying information, the method comprising:
   sending the information from a number of sources to a display unit; wherein the display unit comprises a protective layer that has a surface having a texture that causes a desired airflow over the protective layer;
   displaying the information through pixels located in the display unit; and
   transferring heat in the display unit through a conductive path.

16. The method of claim 15, wherein transferring the heat in the display unit through the conductive path comprises:
   performing at least one of cooling or heating the pixels in the display unit.

17. The method of claim 15, wherein sending the information from the number of sources to the display unit comprises:
   sending the information from the number of sources in data signals to the display unit through the conductive path.

18. The method of claim 15 further comprising:
   sending power signals to the display unit through the conductive path.

19. The method of claim 15, wherein the display unit includes circuits connected to the conductive path and further comprising:
   sending at least one of data signals or power signals to the circuits through the conductive path.

20. The method of claim 15, wherein the protective layer is selected from one of a flexible layer and a rigid layer.

* * * * *